(12) United States Patent
Hansen

(10) Patent No.: US 12,296,485 B2
(45) Date of Patent: May 13, 2025

(54) ROBOT ARM WITH ADAPTIVE THREE-DIMENSIONAL BOUNDARY IN FREE-DRIVE

(71) Applicant: Universal Robots A/S, Odense S. (DK)

(72) Inventor: Jacob Gregers Hansen, Kolding (DK)

(73) Assignee: Universal Robots A/S, Odense S. (DK)

( * ) Notice: Subject to any disclaimer, the term of this patent is extended or adjusted under 35 U.S.C. 154(b) by 17 days.

(21) Appl. No.: 17/770,896

(22) PCT Filed: Oct. 9, 2020

(86) PCT No.: PCT/DK2020/050285
§ 371 (c)(1),
(2) Date: Apr. 21, 2022

(87) PCT Pub. No.: WO2021/078346
PCT Pub. Date: Apr. 29, 2021

(65) Prior Publication Data
US 2022/0379468 A1 Dec. 1, 2022

(30) Foreign Application Priority Data
Oct. 22, 2019 (DK) .................. 2019 01239

(51) Int. Cl.
*B25J 9/16* (2006.01)
(52) U.S. Cl.
CPC .................. *B25J 9/1641* (2013.01)
(58) Field of Classification Search
CPC .................. G05B 19/423
See application file for complete search history.

(56) References Cited

U.S. PATENT DOCUMENTS

| 3,473,386 A | 10/1969 | Nielsen, Jr. et al. |
| 4,166,543 A | 9/1979 | Dahlstrom |

(Continued)

FOREIGN PATENT DOCUMENTS

| CN | 101421081 A | 4/2009 |
| CN | 103250109 | 8/2013 |

(Continued)

OTHER PUBLICATIONS

Bennett et al., "Autonomous Calibration of Single-Loop Closed Kinematic Chains Formed by Manipulators with Passive Endpoint Constraints," IEEE Transactions of Robotics and Automation, 7(5):597-606 (1991), 10 pages.

(Continued)

*Primary Examiner* — Khoi H Tran
*Assistant Examiner* — Tristan J Greiner
(74) *Attorney, Agent, or Firm* — ArentFox Schiff LLP

(57) ABSTRACT

The invention relates to a robot controller controlling a robot arm, the robot controller is configured to maintain the robot arm in a static posture when only gravity is acting on the robot arm and allow change in posture of the robot arm 5 when an external force different from gravity is applied to the robot arm. The free-drive mode of operation is activatable by a user establishing a free-drive activation signal to the robot controller, which in free-drive mode of operation is configured within at a free-drive safety period to allow a part of said robot arm to be moved within a virtual three-dimensional geometric shape 10 surrounding the part of the robot arm.

20 Claims, 4 Drawing Sheets

(56) References Cited

U.S. PATENT DOCUMENTS

| | | |
|---|---|---|
| 4,398,110 A | 8/1983 | Flinchbaugh et al. |
| 4,678,952 A | 7/1987 | Peterson et al. |
| 4,744,039 A | 5/1988 | Suzuki et al. |
| 4,753,569 A | 6/1988 | Pryor |
| 4,763,531 A | 8/1988 | Deitrich et al. |
| 4,817,017 A | 3/1989 | Kato |
| 5,103,941 A | 4/1992 | Vranish |
| 5,155,423 A | 10/1992 | Karlen et al. |
| 5,220,261 A | 6/1993 | Kempas |
| 5,293,107 A | 3/1994 | Akeel |
| 5,341,289 A | 8/1994 | Lee |
| 5,353,386 A | 10/1994 | Kasagami et al. |
| 5,363,474 A | 11/1994 | Sarugaku et al. |
| 5,495,410 A | 2/1996 | Graf |
| 5,880,956 A | 3/1999 | Graf |
| 6,040,109 A | 3/2000 | Coppens et al. |
| 6,041,274 A | 3/2000 | Onishi et al. |
| 6,070,109 A | 5/2000 | McGee et al. |
| 6,131,296 A | 10/2000 | Faeger |
| 6,212,433 B1 | 4/2001 | Behl |
| 6,212,443 B1 | 4/2001 | Nagata et al. |
| 6,292,715 B1 | 9/2001 | Rongo |
| 6,408,224 B1* | 6/2002 | Okamoto .............. B25J 17/025 29/721 |
| 6,519,860 B1 | 2/2003 | Sieg et al. |
| 6,535,794 B1 | 3/2003 | Raab |
| 6,678,582 B2 | 1/2004 | Waled |
| 6,704,619 B1 | 3/2004 | Coleman et al. |
| 6,822,412 B1 | 11/2004 | Gan et al. |
| 6,837,892 B2 | 1/2005 | Shoham |
| 6,847,922 B1 | 1/2005 | Wampler |
| 6,856,863 B1 | 2/2005 | Sundar |
| 6,922,610 B2 | 7/2005 | Okamoto et al. |
| 6,996,456 B2 | 2/2006 | Cordell et al. |
| 7,035,716 B2 | 4/2006 | Harris et al. |
| 7,248,012 B2 | 7/2007 | Takahashi et al. |
| 7,272,524 B2 | 9/2007 | Brogardh |
| 7,278,222 B2 | 10/2007 | Maier et al. |
| 7,298,385 B2 | 11/2007 | Kazi et al. |
| 7,300,240 B2 | 11/2007 | Brogardh |
| 7,571,025 B2 | 8/2009 | Bischoff |
| 7,643,907 B2 | 1/2010 | Fuhlbrigge et al. |
| 7,756,608 B2 | 7/2010 | Brogardh |
| 8,002,716 B2 | 8/2011 | Jacobsen et al. |
| 8,050,797 B2 | 11/2011 | Lapham |
| 8,160,205 B2 | 4/2012 | Saracen et al. |
| 8,255,462 B2 | 8/2012 | Kondo |
| 8,301,421 B2 | 10/2012 | Bacon et al. |
| 8,340,820 B2 | 12/2012 | Nair |
| 8,410,732 B2 | 4/2013 | Kassow et al. |
| 8,428,816 B2 | 4/2013 | Buur et al. |
| 8,457,786 B2 | 6/2013 | Andersson |
| 8,571,706 B2 | 10/2013 | Zhang et al. |
| 8,571,711 B2 | 10/2013 | Jacobsen et al. |
| 8,583,285 B2 | 11/2013 | Aurnhammer et al. |
| 8,614,559 B2 | 12/2013 | Kassow et al. |
| 8,756,973 B2 | 6/2014 | Wallace et al. |
| 8,774,965 B2 | 7/2014 | Weiss et al. |
| 8,779,715 B2 | 7/2014 | Kassow et al. |
| 8,812,155 B2 | 8/2014 | Brethe |
| 9,248,573 B2 | 2/2016 | Sae-Knudsen et al. |
| 9,250,624 B2 | 2/2016 | Zimmermann |
| 9,592,608 B1 | 3/2017 | Bingham et al. |
| 9,696,221 B2 | 7/2017 | Lauzier et al. |
| 9,827,674 B2 | 11/2017 | Tronnier et al. |
| 9,833,897 B2 | 12/2017 | Søe-Knudsen et al. |
| 9,925,662 B1 | 3/2018 | Jules et al. |
| 10,016,900 B1 | 7/2018 | Meyer et al. |
| 10,166,676 B1 | 1/2019 | Hudson et al. |
| 10,399,232 B2 | 9/2019 | Oestergaard et al. |
| 10,576,629 B2 | 3/2020 | Rohmer et al. |
| 10,639,799 B2 | 5/2020 | Katou et al. |
| D895,704 S | 9/2020 | Johansen |
| D895,705 S | 9/2020 | Johansen |
| D895,706 S | 9/2020 | Johansen |
| D898,090 S | 10/2020 | Johansen |
| 10,850,393 B2 | 12/2020 | Oestergaard et al. |
| D915,487 S | 4/2021 | Sell |
| D924,228 S | 7/2021 | Mirth |
| 11,110,612 B2 | 9/2021 | Masuda et al. |
| D932,485 S | 10/2021 | Mirth |
| D932,486 S | 10/2021 | Mirth |
| D932,487 S | 10/2021 | Mirth |
| 11,173,614 B2 | 11/2021 | Adachi et al. |
| 11,260,543 B2 | 3/2022 | Johansen |
| 11,318,608 B2 | 5/2022 | Motoyoshi et al. |
| 11,474,510 B2 | 10/2022 | Oestergaard et al. |
| 11,796,045 B2 | 10/2023 | Johansen |
| 11,839,979 B2 | 12/2023 | Rosenlund et al. |
| 11,964,389 B2 | 4/2024 | Johansen |
| 12,011,824 B2 | 6/2024 | Vraa et al. |
| 2002/0013675 A1 | 1/2002 | Knoll et al. |
| 2003/0120391 A1 | 6/2003 | Saito |
| 2004/0078114 A1 | 4/2004 | Cordell et al. |
| 2004/0172164 A1 | 9/2004 | Habibi et al. |
| 2004/0189631 A1 | 9/2004 | Kazi et al. |
| 2004/0212626 A1 | 10/2004 | Lyxzen et al. |
| 2005/0080515 A1 | 4/2005 | Watanabe et al. |
| 2005/0267637 A1 | 12/2005 | Lapham |
| 2005/0273198 A1 | 12/2005 | Bischoff |
| 2005/0273200 A1* | 12/2005 | Hietmann .............. B25J 9/1666 700/248 |
| 2006/0069466 A1 | 3/2006 | Kato |
| 2006/0125806 A1 | 6/2006 | Voyles et al. |
| 2006/0163939 A1 | 7/2006 | Kuramochi et al. |
| 2006/0178775 A1 | 8/2006 | Zhang et al. |
| 2006/0201010 A1 | 9/2006 | Maier et al. |
| 2007/0142823 A1 | 6/2007 | Prisco et al. |
| 2008/0004632 A1 | 1/2008 | Sutherland et al. |
| 2008/0140258 A1 | 6/2008 | Ueno et al. |
| 2008/0188983 A1 | 8/2008 | Ban et al. |
| 2008/0188986 A1 | 8/2008 | Hoppe et al. |
| 2008/0319557 A1 | 12/2008 | Summers et al. |
| 2009/0076655 A1 | 3/2009 | Blondel et al. |
| 2009/0157226 A1 | 6/2009 | de Smet |
| 2009/0259337 A1 | 10/2009 | Harrold et al. |
| 2009/0289591 A1 | 11/2009 | Kassow et al. |
| 2010/0145520 A1 | 6/2010 | Gerio et al. |
| 2010/0241270 A1 | 9/2010 | Eliuk et al. |
| 2010/0312392 A1 | 12/2010 | Zimmerman |
| 2011/0022216 A1 | 1/2011 | Andersson |
| 2011/0106305 A1* | 5/2011 | Brethe .................. B25J 9/1015 700/245 |
| 2011/0213497 A1* | 9/2011 | Nair ....................... B25J 9/1666 700/255 |
| 2011/0224826 A1 | 9/2011 | Maehara et al. |
| 2012/0130541 A1 | 5/2012 | Szalek |
| 2012/0210817 A1 | 8/2012 | Kassow et al. |
| 2012/0239193 A1 | 9/2012 | Mizutani |
| 2013/0013108 A1 | 1/2013 | Jacobsen et al. |
| 2013/0079928 A1 | 3/2013 | Soe-Knudssen et al. |
| 2013/0231778 A1 | 9/2013 | Ostergaard |
| 2013/0255426 A1 | 10/2013 | Kassow et al. |
| 2014/0039681 A1* | 2/2014 | Bowling ................ A61B 34/30 700/261 |
| 2014/0107843 A1 | 4/2014 | Okazaki |
| 2015/0204742 A1 | 7/2015 | Draisey |
| 2015/0217445 A1 | 8/2015 | Hietmann et al. |
| 2016/0121484 A1 | 5/2016 | Ikeda et al. |
| 2016/0136805 A1 | 5/2016 | Søe-Knudsen et al. |
| 2016/0375588 A1 | 12/2016 | Ueberle et al. |
| 2017/0007336 A1 | 1/2017 | Tsuboi et al. |
| 2017/0057095 A1 | 3/2017 | Oestergaard et al. |
| 2017/0334070 A1 | 11/2017 | Bordegnoni et al. |
| 2018/0029221 A1 | 2/2018 | Tanaka et al. |
| 2018/0079090 A1 | 3/2018 | Koenig et al. |
| 2018/0080841 A1 | 3/2018 | Cordoba et al. |
| 2018/0178380 A1 | 6/2018 | Oestergaard et al. |
| 2018/0215050 A1 | 8/2018 | Kassow |
| 2018/0296284 A1 | 10/2018 | Miller et al. |
| 2018/0304460 A1 | 10/2018 | Lin et al. |
| 2019/0086907 A1 | 3/2019 | Oestergaard et al. |
| 2019/0091873 A1 | 3/2019 | Katou et al. |
| 2019/0176334 A1* | 6/2019 | Zhou ....................... A61B 34/37 |

(56) References Cited

U.S. PATENT DOCUMENTS

| | | |
|---|---|---|
| 2019/0248006 A1 | 8/2019 | Takahashi |
| 2020/0171658 A1 | 6/2020 | Kielsholm Thomsen |
| 2020/0340569 A1 | 10/2020 | Johansen |
| 2020/0391393 A1 | 12/2020 | Johansen |
| 2021/0039254 A1 | 2/2021 | Oestergaard et al. |
| 2021/0086374 A1 | 3/2021 | Brandt et al. |
| 2021/0237284 A1 | 8/2021 | Vraa et al. |
| 2021/0260757 A1 | 8/2021 | Nielsen et al. |
| 2021/0260759 A1 | 8/2021 | Knudsen et al. |
| 2022/0161433 A1 | 5/2022 | Beck et al. |
| 2022/0184810 A1 | 6/2022 | Beck et al. |
| 2022/0226993 A1 | 7/2022 | Madsen |
| 2022/0379463 A1 | 12/2022 | Hansen |
| 2022/0379468 A1 | 12/2022 | Hansen |
| 2022/0388156 A1 | 12/2022 | Hansen |
| 2023/0035296 A1 | 2/2023 | Søe-Knudsen et al. |
| 2023/0052996 A1 | 2/2023 | Thomsen |
| 2023/0191603 A1 | 6/2023 | Thomsen et al. |
| 2023/0405819 A1 | 12/2023 | Kravchenko et al. |
| 2023/0405822 A1 | 12/2023 | Kravchenko et al. |
| 2023/0418258 A1 | 12/2023 | Mirth |
| 2024/0351209 A1 | 10/2024 | Graabæk et al. |

FOREIGN PATENT DOCUMENTS

| | | | |
|---|---|---|---|
| DE | 2735632 | 9/1983 | |
| DE | 19858154 | 6/2000 | |
| DE | 10048096 | 4/2002 | |
| DE | 10157174 | 6/2003 | |
| DE | 10239694 | 3/2004 | |
| DE | 10361132 A1 | 1/2005 | |
| DE | 102006061752 | 7/2008 | |
| DE | 102008027008 | 12/2009 | |
| DE | 102015106227 B3 | 5/2016 | |
| DK | 180508 B1 | 10/2019 | |
| EP | 0850730 A1 | 7/1998 | |
| EP | 1505464 | 2/2005 | |
| EP | 1632318 A2 | 3/2006 | |
| EP | 1696289 | 8/2006 | |
| EP | 1724676 | 11/2006 | |
| EP | 1764192 A1 | 3/2007 | |
| EP | 2258521 | 12/2010 | |
| EP | 2453325 | 5/2012 | |
| EP | 2641136 | 9/2013 | |
| EP | 2864085 | 4/2015 | |
| EP | 2864085 A2 | 4/2015 | |
| EP | 3015932 | 5/2016 | |
| EP | 2864085 B1 * | 11/2016 | .......... B25J 11/0005 |
| EP | 3473386 A1 | 4/2019 | |
| ES | 2548037 | 10/2015 | |
| JP | H01-146645 | 6/1989 | |
| JP | H02-250782 | 10/1990 | |
| JP | H03291119 A | 12/1991 | |
| JP | H06-190753 | 7/1994 | |
| JP | H09141580 A | 6/1997 | |
| JP | H10-254527 | 9/1998 | |
| JP | 2001-050741 | 2/2001 | |
| JP | 2002-120174 | 4/2002 | |
| JP | 2004-049731 | 2/2004 | |
| JP | 2004-148466 | 5/2004 | |
| JP | 2004-316722 | 11/2004 | |
| JP | 2005-148789 | 6/2005 | |
| JP | 2005-342885 | 12/2005 | |
| MX | 2013005425 A | 8/2013 | |
| RU | 2013125348 A | 12/2014 | |
| WO | 1997000454 | 1/1997 | |
| WO | 2004071717 | 8/2004 | |
| WO | 2007099511 | 9/2007 | |
| WO | 2009107358 | 9/2009 | |
| WO | 2012066025 | 5/2012 | |
| WO | 2013192500 | 12/2013 | |
| WO | 2014/110682 A1 | 7/2014 | |
| WO | 2017/178469 A1 | 10/2017 | |
| WO | 2019/190487 A1 | 10/2018 | |
| WO | 2019/055883 A1 | 3/2019 | |
| WO | 2019/074669 A1 | 4/2019 | |
| WO | 2019102746 | 5/2019 | |

OTHER PUBLICATIONS

Communication pursuant to Article 94(3) EPC for EP15176362.0-1802, 4 pages (Jan. 5, 2017).
Communication pursuant to Article 94(3) EPC for EP15176362.0-1802, 5 pages (Aug. 13, 2018).
Definition of Flange, Merriam-Webster Dictionary, Jun. 23, 2015, URL: http://www.merriamwebster.com/dictionary/flange, 4 pages.
Definition of Robot, Dictionary.com, Jun. 23, 2015, URL: http://dictionarv.reference.com/browse/robot?s=t, 5 pages.
Espacenet Patent Search; Family List EP2641136 downloaded Jun. 5, 2017 (2 pages).
File History for CN201180054670 downloaded Jun. 5, 2017 (70 pages).
File History for EP2453325 downloaded Jun. 5, 2017 (48 pages).
File History for EP2641136 downloaded Jun. 5, 2017 (1116 pages) (counterpart to U.S. Appl. No. 13/885,233).
File History for EP3015932 downloaded Jun. 5, 2017 (93 pages).
First Examination Report for IN Application No. 1608/KALNP/2013 (Mar. 26, 2019), 6 pages.
Maier, C., Aufbau und Einsatz von Industrierobotern, Design and Use of Industrial Robots, Lecture Notes, 3rd Edition, Institute for Production Technology, 11 pages (1996). [English translation unavailable].
Opposition against EP 2641136 B1, 27 pages (Jul. 22, 2015).
Summons in counterpart European case to attend oral proceedings pursuant to Rule 115(1) EPC for EP11784999.2-1802 / 2641136, 8 pages (Dec. 1, 2016), 8 pages.
User Manual KR C2 / KR C3 Expert Programming, KUKA System Software (KSS) Release 5.2, Version 00: 183 pages (2003).
International Search Report in Application No. PCT/EP2011/070228 dated Apr. 25, 2012, 3 pages.
Written Opinion in Application No. PCT/EP2011/070228 dated May 16, 2013, 7 pages.
International Preliminary Report on Patentability in Application No. PCT/EP2011/070228 dated Feb. 27, 2013, 26 pages.
International Preliminary Report on Patentability in Application No. PCT/DK2020/050283 dated Apr. 26, 2022 (8 pages).
International Search Report and Written Opinion in Application No. PCT/DK2020/050283 dated Feb. 9, 2021 (11 pages).
International Search Report and Written Opinion in Application No. PCT/DK2020/050284 dated Feb. 3, 2021 (9 pages).
International Preliminary Report on Patentability in Application No. PCT/DK2020/050284 dated Apr. 26, 2022 (7 pages).
International Preliminary Report on Patentability in Application No. PCT/DK2020/050285 dated Apr. 26, 2022 (7 pages).
International Search Report and Written Opinion in Application No. PCT/DK2020/050285 dated Feb. 9, 2021 (9 pages).
Action and Response History in U.S. Appl. No. 17/770,715 downloaded from Patent Center on Feb. 6, 2024, 42 pages.
Action and Response History in U.S. Appl. No. 17/770,733 downloaded from Patent Center on Feb. 6, 2024, 181 pages.
Communication pursuant to Article 94(3) EPC in Application No. 20807659.6 dated Jun. 29, 2023, 6 pages.
Communication pursuant to Article 94(3) EPC in Application No. 20808013.5 dated Jun. 29, 2023, 6 pages.
Communication pursuant to Article 94(3) EPC in Application No. 20808012.7 dated Jun. 29, 2023, 6 pages.
European Office Action dated Jul. 8, 2024, for Application No. EP20808012.7 (8 pages).
European Office Action dated Jul. 8, 2024, for Application No. EP20808013.5 (10 pages).
European Office Action dated Jul. 8, 2024, for Application No. EP20807659.6 (8 pages).
Communication pursuant to Article 94(3)EPC in Application No. 19730181.5 dated Aug. 3, 2023 (10 pages).
International Search Report for PCT/EP2018/084854, 5 pages (dated Jun. 20, 2019).

(56) References Cited

OTHER PUBLICATIONS

International Search Report for PCT/EP2019/065857, 4 pages (dated Oct. 8, 2019).
Jeremy A. Marvel et al.: "Implementing speed and separation monitoring in collaborative robot workcells", Robotics and Computer Integrated Manufacturing, Elsevier Science Publishers BV., Barking, GB, vol. 44, Aug. 27, 2016, pp. 144-155, ISSN: 0736-5845, DOI: 10.1016/J.RCIM.2016.01.001, XP029830786.
Schou C et al., "Human-robot Interface for Instructing Industrial Tasks Using Kinesthetic Teaching", IEEE ISR 2013, (Oct. 24, 2013) [XP032546561].
Written Opinion for PCT/EP2018/084854, 9 pages (dated Jun. 20, 2019).
Written Opinion for PCT/EP2018/065857, 11 pages (dated Oct. 8, 2019).
Office Actions and Responses in U.S. Pat. No. 11,838,979 downloaded Nov. 22, 2024 (57 pages).
Office Action received for Chinese Patent Application No. 202080074187.3 with English translation, mailed on Feb. 27, 2025, 17 pages.
Search report for DK Application No. PA 2019 01237 dated Apr. 29, 2020 (9 pgs.).
Search report for DK Application No. PA 2019 01238 dated Apr. 14, 2020 (7 pgs.).
Search report for DK Application No. PA 2019 01239 dated Apr. 16, 2020 (9 pgs.).
File History of EP4048486 downloaded Dec. 20, 2024 (388 pgs.).
File History of EP4049103 downloaded Dec. 20, 2024 (527 pgs.).
File History of EP4049104 downloaded Dec. 20, 2024 (518 pgs.).
Universal Robots User Manual UR3/CB3, Version 3.1 (rev. 17782) 2015.

* cited by examiner

ROBOT ARM WITH ADAPTIVE THREE-DIMENSIONAL BOUNDARY IN FREE-DRIVE

CROSS-REFERENCE TO RELATED APPLICATIONS

This application is a U.S. national stage entry of PCT Application No. PCT/DK2020/050285, which was filed on Oct. 9, 2020. PCT Application No. PCT/DK2020/050285 claims priority to Denmark Patent Application No. PA201901239, which was filed on Oct. 22, 2019. This application claims priority to PCT Application No. PCT/DK2020/050285 and to Denmark Patent Application No. PA201901239. The contents of PCT/DK2020/050285 and Denmark Patent Application No. PA201901239 are incorporated herein by reference.

FIELD OF THE INVENTION

The present invention relates to a robot arm having a robot controller controlling a plurality of robot joints of the robot arm connecting a robot base and a robot tool flange, where the robot joints of the robot arm can be manually manipulated by a user in a so call free-drive mode.

BACKGROUND OF THE INVENTION

Robot arms comprising a plurality of robot joints and links where motors or actuators can move part of the robot arm in relation to each other are known in the field of robotics. Typically, the robot arm comprises a robot base which serves as a mounting base for the robot arm; and a robot tool flange where to various tools can be attached. A robot controller is configured to control the robot joints in order to move the robot tool flange in relation to the base. For instance, in order to instruct the robot arm to carry out a number of working instructions. The robot joints may be rotational robot joints configured to rotate parts of the robot arm in relation to each other, prismatic joints configured to translate parts of the robot arm in relation to each other and/or any other kind of robot joints configured to move parts of the robot arm in relation to each other.

Typically, the robot controller is configured to control the robot joints based on a dynamic model of the robot arm, where the dynamic model defines a relationship between the forces acting on the robot arm and the resulting accelerations of the robot arm. Often, the dynamic model comprises a kinematic model of the robot arm, knowledge about inertia of the robot arm and other parameters influencing the movements of the robot arm. The kinematic model defines a relationship between the different parts of the robot arm and may comprise information of the robot arm such as, length, size of the joints and links and can for instance be described by Denavit-Hartenberg parameters or like. The dynamic model makes it possible for the controller to determine which torques and/or forces the joint motors or actuators shall provide in order to move the robot joints for instance at specified velocity, acceleration or in order to hold the robot arm in a static posture.

Robot arms need to be programmed by a user or a robot integrator which defines various instructions for the robot arm, such as predefined moving patterns and working instructions such as gripping, waiting, releasing, screwing instructions. The instruction can be based on various sensors or input signals which typically provide a triggering signal used to stop or start at a given instruction. The triggering signals can be provided by various indicators, such as safety curtains, vision systems, position indicators, etc.

Typically, it is possible to attach various end effectors to the robot tool flange or other parts of the robot arm, such as grippers, vacuum grippers, magnetic grippers, screwing machines, welding equipment, dispensing systems, visual systems, etc. When providing such end effector, it is necessary to provide an estimation of the payload information that such end effector provides to the robot arm. Typically, the user manually enters the payload information into the kinematic model where after the controller can take the payload information into account when controlling the robot. Typically, the payload information comprises information in relation to the weight and pose of the object, where pose of the object relates to the position and orientation of the object in relation to the robot arm e.g. the robot tool flange. The pose can for instance be indicated as the position of the center of mass of the object in relation to the robot tool flange. Many users have difficulties setting the correct payload information or ignore/forget to set it at all.

Many robot arms can be set into a so call free-drive or Zero G mode of operation, where a user manually can change the posture of the robot arm by pushing or pulling the robot arm and where the robot controller is configured to hold the robot arm in a posture when a user is not pushing or pulling the robot arm. In the free-drive mode of operation, the robot controller is configured to control the motor torque provided by the motor of the robot joints based on joint encoders and a dynamic model of the robot. Typically, the joint encoders provide a signal indicating the joint angle of each of the joints and the controller can based on the joint angles and a dynamic model of the robot calculate the force/torque needed to maintain the robot arm in a posture. When a user pushes or pulls the robot arm a change in joint angle can be registered and the robot controller is configured to allow movement of the robot. In some embodiment the controller can be configured to apply a motor torque to the joint motors when a change in joint angle is registered for instance in order to assist movement of the robot arm, apply some resistance that the user need to overcome in order to change the posture of the robot arm. Some robot arms comprise torque sensors configured to indicate the torque applied to each of the robot joints and the robot controller can be configured to control the motor torques applied to the robot joints based on the torques applied to the robot joint.

The known free-drive modes require manipulation of the individual robot joints in order for the robot arm to change posture which in some situations may be difficult, for instance at work stations where a part of the robot arm is put behind a shield preventing a user from rotating some of the robot joints.

U.S. Pat. No. 6,212,433B1 discloses a direct teaching apparatus which allows an operator to perform the direct teaching of a robot in safety. The apparatus includes a force detector and a teaching tool. The tool includes a working tool or handle fixed to the first detector and held by the operator to lead the robot. It also includes a device for computing the position or speed directive based on the force detector data and a motion model. It further includes a device for computing the generation torque of a motor for driving a robot depending on the position or speed directive and a controller to control the generated torque. The user needs to configure an provide the teaching apparatus to the robot system which complicates the usage of the teaching apparatus and further the user can only move the robot arm from the teaching apparatus.

US 2012/130541 discloses a method and apparatus for the direct and safe teaching of a robot. The apparatus consists of a plurality of tactile sensors and electronic circuitry encapsulated in a compact enclosure, and a handle protruding from the enclosure. The handle provides an easy means for an operator to apply an external force and to act on the sensors that generate electronic signals to the robot controller. The user needs to configure an provide the handle apparatus to the robot system which complicates the usage of the handle apparatus as the axis of the handle apparatus need to be linked to specified joints and further the user can only move the robot arm using the handle apparatus.

Safe operation of the robot arm in free-drive mode requires correct specification of e.g. weight of the payload to the robot controller, to avoid hazardous situations upon activation of the free-drive mode. Further, it is a known problem that sensors used e.g. in determination of the weight of payload drifts over time leading to a wrong payload weight calculation made by the robot controller and potential hazardous situations. Hence hazardous situations may occur if e.g. the force needed to maintain the robot arm in a given posture is based on a wrong calculation of payload weight.

SUMMARY OF THE INVENTION

The object of the present invention is to address the above described limitations with the prior art or other problems of the prior art. This is achieved by a robot controller, a robot and a method according to a first aspect, a second and/or a third aspect of the present invention, where various embodiments of the first aspect, the second aspect and the third aspect of the invention the following paragraphs.

First Aspect of the Invention

This is achieved by a robot controller, robot arm and method according to a first aspect of the present invention, where a robot controller for controlling a robot arm is switchable from a current mode of operation into a free-drive mode of operation where the robot controller in the free-drive mode of operation is configured to:
  maintain the robot arm in a static posture when only gravity is acting on the robot arm;
  allow change in posture of the robot arm when an external force different from gravity is applied to the robot arm;
wherein the free-drive mode of operation is activatable by a user establishing a free-drive activation signal to the robot controller, wherein the robot controller upon receiving the free-drive activation signal is configured to initiate a free-drive mode activation sequence comprising the steps of:
  in a predetermined activation sequence period of time monitor a value of at least one joint sensor parameter, and
  compare the value of the at least one joint sensor parameter to at least one free-drive activation joint sensor parameter threshold value;
wherein the robot controller is configured to switch to the free-drive mode of operation if the value of the at least one joint sensor parameter does not exceed the at least one free-drive activation joint sensor parameter threshold value within the predetermined activation sequence period of time.

Defining an activation sequence period of time (also sometimes referred to as time window) within which defined joint sensor parameter value is compared to a threshold is advantageous in that it has the effect, that joint sensor parameters not intended to activate free-drive is sorted out. Hereby is ensured that a collision or random bump into the robot arm, its tool or payload does not activate the free-drive mode. Further, this is advantageous in that it has the effect that entering the free-drive mode is not possible if the measured value exceeded the related threshold value within the defined time period. By establishing this activation sequence period of time is established an intermediate free-drive mode test period of time which is advantageous in that it has the effect that unexpected movement of the robot arm due to e.g. wrong input of payload weight to the robot controller is prevented or at least reduced by the free-drive activation joint sensor parameter threshold values. The activation joint sensor parameter threshold value can be any kind of value suitable for defining a threshold, such as maximum values, minimum values, specific values, ranges of values, limits of values etc. That a joint sensor parameter does not exceeds the joint sensor parameter threshold value means that the value of the joint sensor parameter is within or does not violate an allowed value as defined by the threshold value. For instance, in case of a maximum threshold value the joint sensor parameter does not exceed the joint sensor parameter threshold value if the value of the joint sensor parameter is smaller than the joint sensor parameter threshold value. Also, in case of a minimum threshold value the joint sensor parameter does not exceed the joint sensor parameter threshold value if the value of the joint sensor parameter is larger than the joint sensor parameter threshold value. Also, in case of a range of threshold values the joint sensor parameter does not exceed the joint sensor parameter threshold value if the value of the joint sensor parameter is larger than a lower joint sensor parameter threshold value and smaller than an upper joint sensor parameter threshold value. Accordingly, when free-drive mode is activated by a user within range of the robot arm, wrong payload weight will not cause the robot arm to move in an unpredicted direction and thereby possibly create a hazardous situation for the user. Movement of the robot arm will be stopped if a monitored joint sensor parameter value exceeds a related threshold value. This paragraph is referred to as application paragraph 0012 below.

After the activation sequence the controller can enter free drive mode of operation where less restrict safety requirements can be allowed, which results in a more user-friendly free drive mode of operation. This paragraph is referred to as application paragraph 0013 below.

According to an embodiment of the invention, the robot controller is configured to stay in the current mode of operation if the value of the at least one joint sensor parameter does exceed the at least one free-drive activation joint sensor parameter threshold value within the predetermined activation sequence period of time. This result in the effect that the robot does not enter a safety stop in case the free drive mode of operation is not activated. This is time saving for the user, as the robot arm does not need to be restarted and/or reactivated due to safety stops. In an embodiment, the user is informed of which joint sensor parameter(s) preventing the entering of the robot arm into the free-drive mode of operation via a user interface. This has the effect, that the user fast and efficiently can remove the obstacle and then subsequently try activating the free-drive mode of operation again.

According to an embodiment of the invention, the predetermined activation sequence period of time is at least any one of the following periods of time: 5 seconds, 3 seconds, 2 seconds, 1 second, ½ second and ¼ second. This is advantageous in that it has the effect, that the robot arm will enter the free-drive mode activation sequence period for at least a predetermined period of time of at least 5 seconds, 3 seconds, 2 seconds, 1 second, ½ second or ¼ second and not enter free-drive mode directly risking hazardous situations due to e.g. a wrong payload weight. Further it can be ensured that the at least one joint sensor parameter does not exceed the at least one free-drive activation joint sensor parameter threshold value for at least a predefined period of time providing a safer activation of free drive mode of operation.

According to an embodiment of the invention, the predetermined activation sequence period of time is at most any one of the following periods of time: 5 seconds, 3 seconds, 2 seconds, 1 second, ½ second and ¼ second. This is advantageous in that it has the effect, that the robot arm will only enter the free-drive mode activation sequence period for at most a predetermined period of time of at most 5 seconds, 3 seconds, 2 seconds, 1 second, ½ second or ¼ second, hereby it is avoided that the robot arm stay in the activation sequence for an unknown period of time which can be annoying to a user. This can be avoided by configuring the robot controller to exit the activation sequence period when the maximum period of time has expired. For instance, if during the activation sequence period it has not been possible to determine if the at least one joint sensor parameter does not exceed the at least one free-drive activation joint sensor parameter threshold value, the robot controller can be configured not to the enter free drive mode of operation.

Consequently, the activation sequence period of time can be executed in any one of the following periods of time after the free drive activation signal have been received: 0¼ second; 0½ second; 0-1 second; 0-2 seconds; 0-3 seconds; 0-5 second; ¼½ second; ¼-1 second; ¼-2 seconds; ¼-3 seconds; ¼-5 seconds; ½-1 second; ½-2 seconds; ½-3 seconds; ½-5 seconds; 1-2 seconds; 1-3 seconds; 1-5 seconds; 2-3 seconds; 2-5 seconds; 3-5 seconds; or any one of the following fixed period of time: ¼ second; ½ second; 1 second; 2 seconds, 3 seconds or 5 seconds. This makes it possible to provide an activation sequence period which ensures that proper verification that the robot arm can be switch into free-drive mode of operations and at the same time prevents annoying the user too much with waiting time.

According to an embodiment of the invention, the robot controller is configured for initiating the free-drive mode activation sequence upon receiving the free-drive activation signal for an activation period of time. This is advantageous in that it has the effect, that only intentional established free-drive signals are used to enter the activation sequence. For instance, the robot controller can be configured to enter the activation sequence upon continuously receiving the free-drive activation signal for the activation period of time. An alternative way of identifying an intentional free-drive activation signal is if the activation free-drive activation signal is received by the robot controller in a predetermined sequence or pattern e.g. of discrete signals. This paragraph is referred to as application paragraph 0018 below.

According to an embodiment of the invention, the predetermined activation period of time is at least any one of the following periods of time: 5 seconds, 3 seconds, 2 seconds, 1 second, ½ second and ¼ second. This is advantageous in that it has the effect, that the robot arm will enter the free-drive mode activation sequence when the robot controller has received the free-drive activation signal for at least a predetermined period of time of at least 5 seconds, 3 seconds, 2 seconds, 1 second, ½ second or ¼ second. This makes it possible to provide a more robust registration of an actual user's intention to activate the free-drive mode activation sequence, as eventual free-drive activation signals generated unintentionally can be sorted out by ensuring the free-drive activation signal is received during the predetermined activation period of time. This paragraph is referred to as application paragraph 0019 below.

According to an embodiment of the invention, the predetermined activation period of time is at most any one of the following periods of time: 5 seconds, 3 seconds, 2 seconds, 1 second, ½ second and ¼ second. This makes it possible to provide a user-friendly registration of an user's intention to activate the free-drive mode activation sequence, as the waiting time for the user generating the free-drive activation signal can be specified to a specific period of time and the user will thus know how long time is needed in order to enter free-drive mode of operation. This paragraph is referred to as application paragraph 0020 below.

Consequently, the activation period of time can be executed in any one of the following periods of time after the initial receipt of the free drive activation: 0¼ second; 0½ second; 0-1 second; 0-2 seconds; 0-3 seconds; 0-5 seconds; ¼½ second; ¼-1 second; ¼-2 seconds; ¼-3 seconds; ¼-5 seconds; ½-1 second; ½-2 seconds; ½-3 seconds; ½-5 seconds; 1-2 seconds; 1-3 seconds; 1-5 seconds; 2-3 seconds; 2-5 seconds; 3-5 seconds; or any one of the following fixed period of time: ¼ second; ½ second; 1 second; 2 seconds, 3 seconds or 5 seconds. This paragraph is referred to as application paragraph 0021 below.

According to an embodiment of the invention, the robot controller is configured for maintaining the robot arm in the free-drive mode of operation for at least a predetermined free-drive period of time. The predetermined free-drive period of time is a period of time in which the robot controller maintains the robot arm in the free-drive mode of operation after the robot controller have switch to the free-drive mode of operation. This ensures that the user after activation of the free-drive mode of operation has some time to initiate movement of the robot arm. This paragraph is referred to as application paragraph 0022 below.

According to an embodiment of the invention, the robot controller is furthermore configured for starting a predetermined restart free-drive period of time when the robot arm is in a static posture. The predetermined restart free-drive period of time is a period of time starting when the robot arm has been arranged in the static posture, for instance when a user has stopped moving the robot arm and thus does not apply a force or a torque to the robot arm. This ensures that the user after having move the robot arm in the free-drive mode of operation has some time to re-start movement of the robot arm, for instance in order to allow the user to change grip of the robot arm or in order to store a waypoint. Additionally, or alternatively the static posture can be initiated when an external force or torque impact on the robot arm terminates. This paragraph is referred to as application paragraph 0023 below.

According to an embodiment of the invention, the robot controller is configured to leave the free-drive mode of operation when the robot arm has been kept in a static posture within the predetermined free-drive period of time or within the predetermined restart free-drive period of time. The predetermined free-drive period of time and the predetermined restart free-drive period of time can be the same and upon expiry hereof, the robot controller leaves the free-drive mode of operation. This paragraph is referred to as application paragraph 0024 below.

Hence in practice, the period of time the robot arm is maintained in the free-drive mode is reset when the user starts moving the joints of the robot arm by applying force/torque. After a period of time (restart free-drive period) starting when the user stops applying a force/torque, the mode of operation will switch to another mode of operation such a teach mode, run mode, stop mode, etc. This is advantageous in that it has the effect, that the user can maintain the robot arm in free-drive mode of operation for as long time as needed by applying a force to the robot arm before expiry of the restart period of time. This allows the user to change his/her grip of the robot arm which in some situation can be desired by the user changing posture of the robot arm in free-drive mode of operation. Further, the user can make the robot controller leave the free-drive mode of operation simply by not applying a force/torque for a period of time defined by the restart period of time. Further, at least in relation to safety (person and mechanic), this is advantageous in that the robot is not maintained in the free-drive mode of operation where drifting of sensors over time otherwise could lead to change of posture of the robot. Such drifting could ultimately result in a collision of payload or robot tool with floor or other objects within range of the robot arm. Furthermore maintaining the robot arm in free-drive mode of operation after a user have left the robot arm may also lead to hazards situations in case another user approaches the robot arm unaware of the fact that the robot arm is in free-drive mode of operation, as an user expects a stationary robot arm to be in a stop/brake mode of operation where the robot arm cannot move. This paragraph is referred to as application paragraph 0025 below.

According to an embodiment of the invention the predetermined free-drive period of time and/or the predetermined restart free-drive period of time is at least 2 seconds allowing a user to change her/his grip of the robot arm and initiate/re-initiate movement of the robot arm before the free-drive period of time and/or the predetermined restart free-drive period expires. However, it is to be understood that the predetermined free-drive period of time and/or the predetermined restart free-drive period of time alternatively can be at least any one of the following periods of time of 10 second, 5 seconds, 3 seconds. Periods of 5-10 seconds will allow the user to perform additional tasks such as registering of waypoints, moving external objects, adjusting tools mounted to the robot arm before the robot arm exits the free-drive mode of operation. This paragraph is referred to as application paragraph 0026 below.

According to an embodiment of the invention the predetermined free-drive period of time and/or the predetermined restart free-drive period of time is at most 5 seconds preventing that a user unintentionally can move the robot arm after having left the robot arm alone for a period of 5 seconds. This reduces the risk of hazardous situations as describe above. However, it is to be understood that the predetermined free-drive period of time and/or the predetermined restart free-drive period of time alternatively can be at most any one of the following periods of time of 10 seconds, 15 seconds, 20 seconds, 30 seconds. Periods of 5-30 seconds will allow the user to perform additional tasks such as registering of waypoints, moving external objects, adjusting tools mounted to the robot arm before the robot arm exits the free-drive mode of operation, while the risk of unintentional movements of the robot arm are still kept at an acceptable level, as a user seldom forgets that the robot arm is in free-drive mode of operation within periods of these times. Further, the risk that another user unintentionally moves the robot arm within this period are also acceptable, as the probability that the robot arm is completely left alone in free-drive mode of operation within a period of 5-30 seconds are very low. This paragraph is referred to as application paragraph 0027 below.

According to an embodiment of the invention, the robot controller is configured to leave the free-drive mode of operation when no external force has been indicated by the at least one joint sensor within the predetermined free-drive period of time or within the predetermined restart free-drive period of time. This paragraph is referred to as application paragraph 0028 below.

According to an embodiment of the invention, the robot controller is configured for leaving the free-drive mode of operation upon receiving a free-drive deactivation signal. The free-drive deactivation signal can for instance be established by a user via a user interface. This is advantageous in that it has the effect, that the user at any time during operation of the robot arm is able to return to a different mode of operation than the free-drive mode of operation. Typically, the modes of operation are referred to as normal operation mode, run mode, remote mode and teach mode also referred to as Free-drive mode of operation. The robot is in normal operation mode e.g. when it is standing still e.g. to be programmed or is in a waiting position. The robot is in run mode e.g. when the robot controller is executing program code i.e. when the robot is in operation. The robot is in teach mode which is also referred to as free-drive mode when a user is able to change posture of the robot by applying a force to part of the robot. Typically, the robot controller enters free-drive mode from normal mode of operation and returns to normal mode of operation from free-drive mode of operation. This paragraph is referred to as application paragraph 0028 below.

Additionally, or alternatively the free-drive deactivation signal can be established based on at least one joint sensor parameter for instance by comparing the value of the at least one joint sensor parameter to at least one free-drive operation joint sensor parameter threshold value. The at least one free-drive operation joint sensor parameter threshold value can be any value defining a limit of a corresponding joint sensor parameter while the robot controller is in free-drive mode of operation. This makes it possible to monitor some joint sensor parameters during the free-drive mode of operation and leave the free-drive mode of operation if these joint sensor parameters exceed certain threshold values. For instance, this makes it possible to monitor the same joint sensor parameters as monitored in the free-drive activation sequence but with different threshold values. In other words, a free-drive activation joint sensor parameter threshold value and free-drive operation joint sensor parameter threshold value may relate to the same joint sensor parameter but have different values. Consequently, it is possible to provide different safety settings when activating the free-drive mode of operation and when being in free-drive mode of operation. This paragraph is referred to as application paragraph 0030 below.

According to an embodiment of the invention, the robot controller is configured for presenting on an interface device the remainder of at least one of the list comprising: activation period of time, activation sequence period of time, free-drive period of time and restart free-drive period of time. This is advantageous in that it has the effect that the user is able to visually see how long time there is left of the activation period of time, the activation sequence period of time, the free-drive period of time and/or the restart free-drive period of time. Such illustration could be provided to the user as any type of 2D or 3D diagram such as curve, column, circle, etc. Also, such diagram illustrated on the user interface could indicate the time passed of a given period of time. A further effect is that the user then is able to see when to apply a force to the robot to stay in Free-drive mode. Further, the robot controller may via the interface device present to the user root cause to events leading to involuntary leaving the free-drive mode as well as guidance on how to (e.g. which joints to move how) get the robot arm back in a starting position, posture or desired location/ orientation in space.

According to an embodiment of the invention the at least one joint sensor parameters is selected from the list comprising speed, acceleration, torque, motor torque, force and position. Speed can for instance indicate speed of a part of the robot arm such as speed of the tool flange in relation to the robot base, angular speed of the robot joints. Acceleration can for instance indicate the acceleration of a part of the robot arm such as acceleration of the tool flange in relation to the robot base, angular acceleration of the robot joints, Position can for instance indicate the position of a part of the robot arm such as position of the tool flange in relation to the robot base, the angular position of the robot joints. Torque and/or force can indicate the torque and/or force applied to a part of the robot arm and/or the torque/force applied by a part of the robot arm for instance to an external object. Motor torque can for instance indicate the torque provided by the joint motors and can for instance be indicate as joint motor current.

According to an embodiment of the invention, a free-drive activation joint sensor parameter threshold relating to a first monitored joint sensor parameter is different from the free-drive activation joint sensor parameter threshold value relating to a second monitored joint sensor parameter. This is advantageous in that it has the effect that e.g. a threshold value related to moving the robot arm (e.g. meters per second) may have a value for acceleration and another for speed. Hence, the robot is allowed to increase speed for a given period of time defined by a first threshold value, whereas the robot arm is allowed to move with a constant speed for a period of time defined by a second threshold value different from the first threshold value. A more strict threshold value for acceleration compared to speed is advantageous in that it has the effect, that fast acceleration may lead to a collision between robot arm and user i.e. a user safety issue, whereas a slow movement of the payload e.g. towards the floor constituted a mechanical safety issue and which can be stopped by the user assisting the robot arm in lifting the payload.

According to an embodiment of the invention, the free-drive activation joint sensor parameter threshold value is defined as a virtual three-dimensional geometric shape surrounding a part of the robot arm. The virtual three-dimensional geometric shape can be any shape defining a boundary around a part of the robot arm, within which the part of the robot arm is allowed to move within a predefined period of time, such as the activation period of time and/or the activation sequence period of time. This is advantageous in that it has the effect, that the free-drive activation joint sensor parameter threshold is moving with the movement of a part of the robot arm and is initiated from the current position of the part of the robot arm. For instance, the virtual three-dimensional geometric shape can surround the tool flange and define a boundary wherein the tool flange is allowed to move during a predefined period of time. It is to be understood that the virtual three-dimensional geometric shape can have any shape for instance a sphere, an ellipsoid, a cube, a cuboid, a cylinder, a pyramid, a polyhedrons or any arbitrary three-dimensional shape. The part of the robot arm surrounded by the three-dimensional shape may in one embodiment be arranged at the center of the three-dimensional shape as this allows the part of the robot arm to move symmetrical within the three-dimensional geometric shape; however, it is noted that the part of the robot arm can be arranged at any position within the three-dimensional shape. Note that the free-drive activation joint sensor parameter threshold value may be dynamic relative to other axis or positions moving with the movement of the robot arm.

According to an embodiment of the invention, the robot controller is configured for determining if the free-drive activation signal is established by a user by providing a robot feedback to the user upon determining the appearance of the free-drive activation signal and wherein the robot controller is configured to enter the free-drive mode of operation upon determining the appearance of a user confirmation signal in response to the robot feedback. The robot feedback can be provided as any signal perceptible by a user such as an audio signal, a visual signal, a haptic feedback, a predetermined posture of one or more joints, predetermined movements of one or more joints or combinations thereof. The visual feedback can e.g. be a light flashing or words or figures on the display of the graphic user interface. The audio signal can e.g. be a tone or voice speaking words such as what the user should do to activate the free-drive mode of operation. The user confirmation signal can be established by a user interacting with a user interface. This is advantageous in that it has the effect, that the robot controller only will enter free-drive mode in case the user has confirmed her/his intentions to do so. Consequently, the user will be aware that the robot arm is about to enter free-drive mode of operation. It is noted that the user confirmation signal can be provided in form of a physical signal, a logic signal, internally within the processor of the robot controller or combinations thereof.

According to an embodiment, the robot controller may be configured only to enter the free-drive mode of operation in case the user confirmation in response to the robot feedback is provided within at least one of the periods of time of: 10 seconds, 5 seconds, 3 seconds, 2 seconds and 1 second from the point in time where the robot feedback stops. This is advantageous in that it has the effect that the robot controller would not enter the free-drive mode of operation in lack of receiving the user confirmation signal within the predefined period of time. Thereby it can be avoided that the robot controller is continuously waiting for a user confirmation signal that will not be generated. Hence, the robot controller does not confuse a random generated free-drive signal upon expiry of this time period and thereby unexpectedly entering into freed-drive mode is avoided.

According to an embodiment, the robot controller can be configured to provide the robot feedback to the user and determining the appearance of the user confirmation in response to the robot feedback as a part of the activation sequence, and if the user confirmation is received within the predetermined activation sequence period of time the robot controller will enter the free-drive mode of operation.

According to an embodiment the user confirmation signal is established by a user activating at least one joint sensor of at least one of the robot joints. For instance, by the user performing at least one of the following: providing a force/torque to the robot arm or a series of forces/torques to a part of the robot arm, moving at least one of the robot joints, twisting a part of the robot arm, arranging the robot arm in posture or a series of postures. For instance, the robot controller can be configured to establish the confirmation signal upon determining the appearance of a predetermined force provided by a user in response to the robot feedback. The predetermined force (could also be referred to as a gesture) detected by the robot controller may be detected by a change in one or more motor joint parameter values. The robot controller can determine that a predetermined force is from a user if the force is applied in a predetermined direction, patter, sequence or the like. Thereby, if such predetermined force is following the robot feedback, the robot controller knows that the free-drive signal first received is not established unintentionally and therefore safely can enter free-drive mode. This is advantageous in that it has the effect, that no unexpected movement of the robot is initiated by the robot controller during the activation period of time of the free-drive mode even though the payload weight is not correctly registered by the robot controller. This makes it possible for the user to establish the confirmation signal directly at the robot arm and the user can thus enter free-drive mode of operation without the need to use a robot teach pendent. This is useful in situations where the user wants to use both hands for guiding the robot in free-drive mode of operation and in situations where the robot arm is remotely positioned from the robot teach pendent.

According to an embodiment the free-drive activation signal is established by a user activating at least one joint sensor of at least one of the robot joints. For instance, by the user performing at least one of the following: providing a force/torque to the robot arm or a series of forces/torques to a part of the robot arm, moving at least one of the robot joints, twisting a part of the robot arm, arranging the robot arm in posture or a series of postures. For instance, the robot controller can be configured to establish the free-drive activation signal upon determining the appearance of a predetermined force provided by a user to the robot arm. The predetermined force (could also be referred to as a gesture) detected by the robot controller may be detected by a change in one or more motor joint parameter values. The robot controller can determine that a predetermined force is from a user if the force is applied in a predetermined direction, patter, sequence or the like. This makes it possible for the user to establish the free-drive activation signal by interacting directly with the robot arm and thus enter free-drive mode of operation without the need to use a robot teach pendent. This is useful in situations where the user wants to use both hands for guiding the robot in free-drive mode of operation and in situations where the robot arm is remotely positioned from the robot teach pendent. It is noted that the user free-drive activation signal can be provided in form of a physical signal, a logic signal, internally within the processor of the robot controller or combinations thereof. This paragraph is referred to as application paragraph 0039 below.

According to an embodiment of the invention, the free-drive activation signal is established by activating a force sensor of the robot arm, wherein the value of force measured upon the activation of the force sensor is above a predetermined force threshold value. Activating the free-drive mode by applying a force to the robot arm is advantageous in that it has the effect, that a user from any location relative to the robot arm can activate the free-drive mode. This includes also being apart from the teach pendent. Accordingly, as long as the user is in a position where she/he can apply a force to the robot arm, free-drive mode can be activated leading to increased flexibility in training of the robot arm. An additional advantage of being able to activate free-drive mode apart from the teach pendent, is that the user then has two hands free to move the robot arm. Two arms are advantages when a precision tool is to be positioned or joints is to be moved following a particular path in space. This paragraph is referred to as application paragraph 0040 below.

In one embodiment, the force sensor is part of or mounted to the robot tool flange. Using the force sensor to establish the free-drive activation signal is advantageous in that it has the effect, that no additional hardware is needed beyond what is already used when the robot arm is in operation. This paragraph is referred to as application paragraph 0041 below.

According to an embodiment of the invention, the predetermined force threshold value is a threshold value for a force in a predetermined orientation in space. This is advantageous in that it has the effect, that only a force above a predetermined magnitude applied in a predetermined orientation in space e.g. in a predetermined direction will have the potential to establish the free-drive activation signal. Hereby the risk of unintentionally activation of the free drive mode of operation is reduced. This paragraph is referred to as application paragraph 0042 below.

According to an embodiment of the invention, the free-drive activation signal is established by activating a force and torque sensor of the robot arm, wherein the value of measured force is above a predetermined force value, and wherein the value of measured torque is below a predetermined torque threshold value. This is advantageous in that it has the effect, that force and torque are both measured leading to an improved sorting out of force signals not intended to activate the free-drive mode. Almost all forces applied to a force and torque sensor of a robot arm is accompanied by a torque. This is however not true if a person intentionally applies a force along one of the sensing axis of the force-torque sensor. In this situation, the force applied would be accompanied by only a very limited torque if any. Hence, a force applied by a person can be filtered from a force applied e.g. from a collision, random touch of the robot arm or tool, vibrations of the robot arm etc. by also evaluating the torque. This paragraph is referred to as application paragraph 0043 below.

In one embodiment, the force sensor and torque sensor are provided as a combined force-torque sensor forming a part of or mounted to the robot tool flange. Using the force-torque sensor to establish the free-drive activation signal is advantageous in that it has the effect, that no additional hardware is needed beyond what is already used when the robot arm is in operation. This paragraph is referred to as application paragraph 0044 below.

According to one embodiment, the joint sensor parameter is selected from the list comprising: speed, acceleration, torque, motor torque, motor current, force and position. This is advantageous in that it has the effect, that movement of the robot arm can be monitored and stopped if the value of one or more of these joint sensor parameters are outside a predetermined range defined by at least one upper or lower threshold value. It should be mentioned, that the joint sensor parameters may also include values derived from actual measured values i.e. values which cannot be measure directly by a sensor but can be established by measured values. This paragraph is referred to as application paragraph 0045 below.

Moreover, the invention relates to a robot arm comprising a plurality of robot joints connecting a robot base and a robot tool flange; where each of the robot joints comprises:
   an output flange rotatable in relation to a robot joint body,
   a joint motor configured to rotate the output flange,
   at least one joint sensor providing a sensor signal indicative of at least one of an angular position of the output flange, an angular position of a shaft of the joint motor, a motor current of the joint motor.

The robot arm comprises at least one robot controller configured to control the robot joints by controlling the motor torque provided by the joint motors based on the sensor signal and the robot controller is further configured as described in any one of the preceding paragraphs under the "Summary Of The Invention" and or as illustrated in the figures and the corresponding description of the figures.

Moreover, the invention relates to a method of activating free-drive mode of operation of a robot arm, wherein the free-drive mode of operation comprises the steps of:
- maintaining the robot arm in a static posture when only gravity is acting on the robot arm;
- changing posture of the robot arm when an external force different from gravity is applied to the robot arm;

where the method comprises the steps of:
- by a user establishing a free-drive activation signal;
- by a robot controller receiving the free-drive activation signal;
- by the robot controller starting a free-drive activation sequence upon receiving the free-drive activation signal;

wherein the free-drive activation sequence comprises the steps of:
- in a predetermined activation sequence period of time monitor a value of at least one joint sensor parameter,
- compare the value of the at least one joint sensor parameter to a least one free-drive activation joint sensor parameter threshold value, and
- by the robot controller change mode of operation of the robot arm to free-drive mode of operation if the value of the at least one joint sensor parameter does not exceed the free-drive activation joint sensor parameter threshold value within the predetermined activation sequence period of time.

This provides the same effects and advantages as described previously (e.g. in application paragraphs 0012 and 0013 above) and makes it possible for the user of a robot arm independent of her/his location relative to the robot arm or interface device is able to activate the free-derive mode of operation in a safe way as the robot arm only are switched into free-drive mode of operation if during the activation sequence period are completed.

According to an embodiment the step of starting the free-drive activation sequence is initiated upon receiving the free-drive activation signal for a predetermined activation period of time. This provides the same effects and advantages as described previously (e.g. in application paragraphs 0018 to 0021 above) and makes it possible to ensure that the received free-drive activation signal is intentionally established by a user.

According to Embodiments the free-drive mode of operation is maintained for a predetermined free-drive period of time;
the method comprises a step of by the robot controller starting a predetermined restart free-drive period of time, when the robot arm is in a static posture; and/or
the method comprises a step of by the robot controller leaving the free-drive mode of operation if the robot arm has been kept in a static posture within the predetermined free-drive period of time or within the predetermined restart free-drive period of time.

This provides the same effects and advantages as described previously (e.g. in application paragraphs 0022 to 0028 above) and makes it possible for a user to change grip when changing posture of the robot arm using both hands.

According to Embodiments the method comprises the steps of:
- establishing a free-drive deactivation signal;
- by the robot controller receiving the free-drive activation signal;
- by the robot controller leaving the free-drive mode of operation upon receiving the free-drive deactivation signal;

and/or
the step of establishing the free-drive deactivation signal comprises the steps of:
- by the robot controller monitor a value of at least one joint sensor parameter,
- by the robot controller compare the value of the at least one joint sensor parameter to a least one free-drive operation joint sensor parameter threshold value, and
- by the robot controller establish the free-drive deactivation signal if the value of the at least one joint sensor parameter does exceed the free-drive operation joint sensor parameter threshold value.

This provides the same effects and advantages as described previously (e.g. in application paragraphs 0029 and 0030) and makes it possible to ensure that a user manually can leave the free-drive mode of operation and/or the robot controller automatically can leave the free-drive mode of operation.

According to an embodiment the step of establishing the free-drive activation signal comprises a step of by a user applying a force at a part of the robot arm. Also, in an embodiment the step of applying a force at a part of the robot arm comprises applying the force in a predetermined orientation in space and at a predetermine position at the robot arm. Also, in an embodiment the step of applying a force at a part of the robot arm comprises applying the force to a force-torque sensor provided at the robot arm; and wherein the free-drive activation signal is established if a force obtained by the force-torque sensor is above a predetermined force value and a torque obtained by the force-torque sensor is below a predetermined torque value. This provides the same effects and advantages as described previously (e.g. in application paragraphs 0039 to 0045 above) and makes it possible for a user to enter the free-drive mode of operation by interacting (e.g. touching. pulling, pushing, lifting etc.) with a part of the robot arm and unintentional free-drive activation signals can be minimized. The predetermined period of time of receiving the free-drive activation signal is wither a continuous period or the sum of two or more discrete time periods of the signal has been received. The unintentional forces are sorted out and thereby are not establishing the free-drive activation signal. This is because a user can apply the force substantially in one direction without also applying a torque. Therefore, if the torque measured is low, while the force measured is higher the robot controller can be configured to interpret this force as a force intentionally applied by a user to activate free-drive mode of operation, as the low torque indicates that a user presses directly towards the force sensor.

Second Aspect of the Invention

The above described limitations with the prior art or other problems of the prior art are also address by a robot controller, robot arm and method according to a second aspect of the present invention. This paragraph is referred to as application paragraph 0054 below.

According to the second aspect, the invention relates to a robot controller for controlling a robot arm is switchable from a current mode of operation into a free-drive mode of operation where the robot controller in the free-drive mode of operation is configured to:
  maintain the robot arm in a static posture when only gravity is acting on the robot arm;
  allow change in posture of the robot arm when an external force different from gravity is applied to the robot arm;
wherein the free-drive mode of operation is activatable by a user establishing a free-drive mode signal to the robot controller and the robot controller is in the free-drive mode of operation configured to:
  monitor a value of at least one joint sensor parameter;
  compare the value of the at least one joint sensor parameter to at least one maintain free-drive joint sensor parameter threshold value;
  maintain the robot arm in the free-drive mode of operation for a maintain free-drive period of time; and
  leave the free-drive mode of operation if the value of the at least one joint sensor parameter does not exceed the at least one maintain free-drive joint sensor parameter threshold value within the maintain free-drive period of time.

Maintaining the robot arm in free-drive mode of operation for the maintain free-drive period of time ensures that the user after activation of the free-drive mode of operation has some time to initiate movement of the robot arm. The maintain free-drive period of time is a period of time in which the robot controller maintains the robot arm in the free-drive mode of operation after the robot controller have switch to the free-drive mode of operation. At the same time safety of the free-drive mode of operation is maintained, as the robot controller is configured to monitor at least one joint sensor parameter and compare the joint sensor parameter with a maintain free-drive sensor parameter threshold value and to leave the free-drive mode of operation if the monitored joint sensor parameter does not exceed the maintain joint sensor parameter threshold value with in the maintain free-drive period of time. That a joint sensor parameter does not exceeds the joint sensor parameter threshold value means that the value of the joint sensor parameter is within or does not violate an allowed value as defined by the threshold value. For instance, in case of a maximum threshold value the joint sensor parameter does not exceed the joint sensor parameter threshold value if the value of the joint sensor parameter is smaller than the joint sensor parameter threshold value. Also, in case of a minimum threshold value the joint sensor parameter does not exceed the joint sensor parameter threshold value if the value of the joint sensor parameter is larger than the joint sensor parameter threshold value. Also, in case of a range of threshold values the joint sensor parameter does not exceed the joint sensor parameter threshold value if the value of the joint sensor parameter is larger than a lower joint sensor parameter threshold value and smaller than an upper joint sensor parameter threshold value. This makes it possible to monitor if the posture of the robot arm is change by a user applying an external force to the robot arm and maintain the robot arm in free-drive mode of operation as along as the user manipulates the posture of the robot arm; however if the user stops changing the posture of the robot arm and leaves the robot arm for the maintain free-drive period of time the robot controller is configured to leave the free-drive mode of operation. This ensure that the robot arm can not be left alone in free-drive mode of operation thereby avoiding hazards situations where another user approaches the robot arm unaware of the fact that the robot arm is in free-drive mode of operation, as an user expects a stationary robot arm to be in a stop/brake mode of operation where the robot arm cannot move. Hence in practice, the period of time the robot arm is maintained in the free-drive mode is reset when the user starts moving the joints of the robot arm by applying force/torque. After a period of time (restart free-drive period) starting when the user stops applying a force/torque, the mode of operation will switch to another mode of operation such a teach mode, run mode, stop mode, etc. This is advantageous in that it has the effect, that the user can maintain the robot arm in free-drive mode of operation for as long time as needed by applying a force to the robot arm before expiry of the restart period of time. This allows the user to change his/her grip of the robot arm which in some situation can be desired by the user changing posture of the robot arm in free-drive mode of operation According to an embodiment of the second aspect of the invention (where this paragraph and the following bullet points are referred to as application paragraph 0055 below), the robot controller is configured to:
  start a restart free-drive period of time if the value of the at least one joint sensor parameter exceeds the at least one maintain free-drive joint sensor parameter threshold value; and
  maintain the robot arm in the free-drive mode of operation for the restart free-drive period of time; and
  leave the free-drive mode of operation if the value of the at least one joint sensor parameter does not exceed the at least one maintain free-drive joint sensor parameter threshold value within said restart free-drive period of time.

The predetermined restart free-drive period of time is a period of time which is started if the value of at least one joint sensor parameter exceeds at least one maintain free-drive joint sensor parameter threshold value. The restart free-drive period of time can be started when the joint sensor parameter exceeds the maintain free-drive parameter, consequently the restart free-drive period of time will be started when a user starts to manipulate the robot arm. In another embodiment the restart free-drive period of time can start when the value of at least one joint sensor parameter does not exceed the at least one maintain free-drive joint sensor parameter threshold value after the value of the at least one joint sensor parameter has exceeded the at least one maintain free-drive joint sensor parameter threshold value. Consequently, the restart free-drive period of time can be started when a user has stopped manipulating the robot arm for instance when the robot arm has been arranged in the static posture, for instance when a user has stopped moving the robot arm and thus does not apply a force or a torque to the robot arm. This ensures that the user after having move the robot arm in the free-drive mode of operation has some time to re-start movement of the robot arm, for instance in order to allow the user to change grip of the robot arm. This paragraph is referred to as application paragraph 0056 below.

According to an embodiment of the second aspect of the invention, the robot controller is configured to leave the free-drive mode of operation when no external force has been indicated by the at least one joint sensor within the predetermined free-drive period of time or within the predetermined restart free-drive period of time. This paragraph is referred to as application paragraph 0057 below.

According to an embodiment of the second aspect of the invention, the maintain free-drive period of time and/or the restart free-drive period of time is at least 2 seconds allowing a user to change her/his grip of the robot arm and initiate/re-initiate movement of the robot arm before the maintain free-drive period of time and/or the restart free-drive period expires. However, it is to be understood that the maintain free-drive period of time and/or the restart free-drive period of time alternatively can be at least any one of the following periods of time of 10 second, 5 seconds, 3 seconds. Periods of 5-10 seconds will allow the user to perform additional tasks such as registering of waypoints, moving external objects, adjusting tools mounted to the robot arm before the robot arm exits the free-drive mode of operation. This paragraph is referred to as application paragraph 0058 below.

According to an embodiment of the second aspect of the invention, the maintain free-drive period of time and/or the restart free-drive period of time is at most 5 seconds preventing that a user unintentionally can move the robot arm after having left the robot arm alone for a period of 5 seconds. This reduces the risk of hazardous situations as describe above. However, it is to be understood that the maintain free-drive period of time and/or the restart free-drive period of time alternatively can be at most any one of the following periods of time of 10 seconds, 15 seconds, 20 seconds, 30 seconds. Periods of 5-30 seconds will allow the user to perform additional tasks such as registering of waypoints, moving external objects, adjusting tools mounted to the robot arm before the robot arm exits the free-drive mode of operation, while the risk of unintentional movements of the robot arm are still kept at an acceptable level, as a user seldom forgets that the robot arm is in free-drive mode of operation within periods of these times. Further, the risk that another user unintentionally moves the robot arm within this period are also acceptable, as the probability that the robot arm is completely left alone in free-drive mode of operation within a period of 5-30 seconds are very. This paragraph is referred to as application paragraph 0059 below.

The maintain free-drive period of time and/or the restart free-drive period of time can be predetermined and provided as values stored in a memory of the robot controller, however in other embodiments a user can be allowed to modify the length of the free-drive period of time and/or the restart free-drive period of time for instance via a user interface. This allows a user to adjust the length of the maintain free-drive period of time and/or the restart free-drive period of time according to personal needs. In one embodiment a maximum time for the maintain free-drive period of time and/or the restart free-drive period of time can be predefined and the robot controller can be configured only to allow the user to adjust the length of the maintain free-drive period of time and/or the restart free-drive period of time to have the maximum defined length. This paragraph is referred to as application paragraph 0060 below.

Hence in practice, the period of time the robot arm is maintained in the free-drive mode is reset when the user starts moving the joints of the robot arm by applying force/torque. After a period of time (restart free-drive period) starting when the user stops applying a force/torque, the mode of operation will switch to another mode of operation such a teach mode, run mode, stop mode, etc. This is advantageous in that it has the effect, that the user can maintain the robot arm in free-drive mode of operation for as long time as needed by applying a force to the robot arm before expiry of the restart period of time. This allows the user to change his/her grip of the robot arm which in some situation can be desired by the user changing posture of the robot arm in free-drive mode of operation Further, the user can make the robot controller leave the free-drive mode of operation simply by not applying a force/torque for a period of time defined by the restart free-drive period of time. Further, at least in relation to safety (person and mechanic), this is advantageous in that the robot is not maintained in the free-drive mode of operation where drifting of sensors over time otherwise could lead to change of posture of the robot. Such drifting could ultimately result in a collision of payload or robot tool with floor or other objects within range of the robot arm. Furthermore maintaining the robot arm in free-drive mode of operation after a user have left the robot arm may also lead to hazards situations in case another user approaches the robot arm unaware of the fact that the robot arm is in free-drive mode of operation, as an user expects a stationary robot arm to be in a stop/brake mode of operation where the robot arm cannot move. This paragraph is referred to as application paragraph 0061 below.

According to an embodiment of the second aspect of the invention, the robot controller is configured to start at least one of the maintain free-drive period of time and the restart free-drive period of time upon expiry of the free-drive mode signal. This result in the fact that the robot arm can be kept in the free-drive mode of operation for the maintain free-drive period of time and/or the restart free-drive period of time after a user have stop establishing the free-drive mode signal. This is for instance useful in situations where the free-drive mode signal is established by a user pushing a free-drive bottom and the user it thus allowed to release the button while the robot arm is kept in free-drive mode of operation for a period of time after the button have been released. This paragraph is referred to as application paragraph 0062 below.

According to an embodiment of the second aspect of the invention, the robot controller is configured to restart the maintain free-drive period of time or the restart free-drive period of time based on a restart free-drive mode signal established by a user. The free-drive restart signal can for instance be established by a user via a user interface. This is advantageous in that it has the effect, that the user at any time during the free-drive mode of operation manually can restart the maintain free-drive period of time or the restart free-drive period of time. This is for instance useful in situations where the user wants the robot arm to stay in free-drive mode of operation at a static posture for a longer/additional period of time e.g. in order to allow the user to perform other tasks. This paragraph is referred to as application paragraph 0063 below.

According to an embodiment of the second aspect of the invention, the at least one joint sensor parameter is selected from the list comprising: acceleration of at least a part of the robot arm, speed of at least a part of the robot arm and position of at least a part of the robot arm and where the maintain free-drive joint sensor parameter threshold value is selected from the list comprising; a threshold acceleration of at least a part of the robot arm, a threshold speed of at least a part of the robot arm and a threshold position of at least a part of the robot arm. Acceleration, speed and position joint sensor parameter relates to the movements of the robot arm and can thus be used to register if a part of the robot arm have been moved and thus should be kept in free-drive mode of operation. For instance, the joint sensor parameter can indicate the acceleration of the robot arm and a corresponding joint sensor parameter threshold value can indicate a maximum acceleration and the robot controller can be configured to leave the free-drive mode of operation if the acceleration of the robot arm has not exceeded the maximum acceleration for the maintain free-drive period of time and/or the restart free-drive period of time. Also, the joint sensor parameter can indicate the speed of the robot arm and a corresponding joint sensor parameter threshold value can indicate a maximum speed and the robot controller can be configured to leave the free-drive mode of operation if the speed of the robot arm has not exceeded the maximum speed for the maintain free-drive period of time and/or the restart free-drive period of time. Also, the joint sensor parameter can indicate the position of the robot arm and a corresponding joint sensor parameter threshold value can indicate a position range and the robot controller can be configured to leave the free-drive mode of operation if the position of the robot arm has been inside the position range for the maintain free-drive period of time and/or the restart free-drive period of time. This paragraph is referred to as application paragraph 0064 below.

According to an embodiment of the second aspect of the invention, the at least one joint sensor parameter is selected from the list comprising: force applied to at least a part of the robot arm and torque applied to at least part of the robot arm and where the maintain free-drive joint sensor parameter threshold value is selected from the list comprising; a threshold force applied to at least a part of the robot arm and a threshold torque applied to at least part of the robot arm. Force and/or torque applied to the robot arm can be used to register if a user in free-drive mode of operation tries to change the posture of the robot arm. Consequently if the force and/or torque applied to the robot arm exceeds a corresponding threshold force and/or a corresponding threshold torque for the maintain free-drive period of time and/or the restart free-drive period of time the robot controller can be configured to maintain the robot arm in free-drive mode of operation as this indicates that a user is changing the posture of the robot arm. The threshold force and/or the threshold torque can for instance be obtained based on gravity's influence of the robot arm. This paragraph is referred to as application paragraph 0065 below.

According to an embodiment of the second aspect of the invention, the robot controller is configured for leaving the free-drive mode of operation upon receiving a free-drive deactivation signal. The free-drive deactivation signal can for instance be established by a user via a user interface. This is advantageous in that it has the effect that the user at any time during operation of the robot arm is able to return to a different mode of operation than the free-drive mode of operation. This paragraph is referred to as application paragraph 0066 below.

According to an embodiment of the second aspect of the invention, the robot controller is configured to provide robot feedback to the user based on at least one of the remainders of the maintain free-drive period of time and the remainder of the restart free-drive period of time. This is advantageous in that it has the effect that the robot controller can inform the user how long time there is left of the maintain free-drive period of time and/or the restart free-drive period of time. Consequently, the user would be able to reset the maintain free-drive period of time and/or the restart free-drive period of time and thereby ensure the that robot arm is maintained in free-drive mode of operation. The robot feedback can be provided as any signal perceptible by a user such as an audio signal, a visual signal, a haptic feedback, a predetermined posture of one or more joints, predetermined movements of one or more joints or combinations thereof. The audio signal can e.g. be a tone, or a set of tones indicating a count down to the expiry of the maintain free-drive period of timer and/or the restart free-drive period of time, or voice speaking words such as what the user should do to reset the maintain free-drive period of timer and/or the restart free-drive period of time. The visual feedback can e.g. be a light flashing or illustrations on the display of the graphic user interface indicating the remainder of the maintain free-drive period and/or the restart free-drive period. Such illustration could be provided to the user as any type of 2D or 3D diagram such as curve, column, circle, etc. Also, such diagram illustrated on the user interface could indicate the time passed of a given period of time. A further effect is that the user then is able to see when to apply a force to the robot to stay in Free-drive mode. Further, the robot controller may via the interface device present to the user root cause to events leading to involuntary leaving the free-drive mode as well as guidance on how to (e.g. which joints to move how) get the robot arm back in a starting position, posture or desired location/orientation in space. This paragraph is referred to as application paragraph 0067 below.

Moreover, according to the second aspect, the invention relates to a robot arm comprising a plurality of robot joints connecting a robot base and a robot tool flange; each of the robot joints comprises:
an output flange rotatable in relation to a robot joint body,
a joint motor configured to rotate the output flange,
at least one joint sensor providing a sensor signal indicative of at least one of an angular position of the output flange, an angular position of a shaft of the joint motor, a motor current of the joint motor.

The robot arm comprises at least one robot controller configured to control the robot joints by controlling the motor torque provided by the joint motors based on the sensor signal and the robot controller is further configured as described in any one of application paragraphs 0053 or 0055 to 0067 and or as illustrated in the figures and the corresponding description of the figures.

Moreover, according to the second aspect, the invention relates to a method of operating a robot arm in free-drive mode of operation, wherein the robot arm by a robot controller has been switched into the free-drive mode of operation upon the robot controller receiving a free-drive activating signal established by a user, wherein the free-drive mode of operation comprises the steps of:
maintaining the robot arm in a static posture when only gravity is acting on the robot arm;
changing posture of the robot arm when an external force different from gravity is applied to the robot arm;
by the robot controller monitor a value of at least one joint sensor parameter;
by the robot controller compare the value of the at least one joint sensor parameter to at least one maintain free-drive joint sensor parameter threshold value;
by the robot controller maintain the robot arm in the free-drive mode of operation for a predetermined maintain free-drive period of time; and
by the robot controller leave the free-drive mode of operation if the value of the at least one joint sensor parameter does not exceed the at least one maintain free-drive joint sensor parameter threshold value within the maintain free-drive period of time.

This provides the same effects and advantages as described previously (e.g. in application paragraph 0053) and makes it possible for a user to manipulate the robot arm in free-drive mode of operation with both hands and without the need of continuously establishing a free-drive signal e.g. by pushing a button.

In an embodiment of the method according to the second aspect of the invention, the method comprises the steps of:
- by the robot controller starting a predetermined restart free-drive period of time, when the value of the at least one joint sensor parameter exceeds the at least one maintain free-drive joint sensor parameter threshold value;
- by the robot controller maintain the robot arm in the free-drive mode of operation for the restart free-drive period of time; and
- by the robot controller leave the free-drive mode of operation if the value of the at least one joint sensor parameter does not exceed the at least one maintain free-drive joint sensor parameter threshold value within the restart free-drive period of time.

This provides the same effects and advantages as described previously (e.g. in application paragraphs 0055 to 0061) and ensures that a user after having move the robot arm in the free-drive mode of operation has some time to re-start movement of the robot arm, for instance in order to allow the user to change grip of the robot arm.

In an embodiment of the method according to the second aspect of the invention, the method comprises the step of:
- by the robot controller starting at least one of the maintain free-drive period of time and the restart free-drive period of time upon expiry of the free-drive mode signal.

This provides the same effects and advantages as described previously (e.g. in application paragraph 0062) and ensures that the robot arm can be kept in the free-drive mode of operation for the maintain free-drive period of time and/or the restart free-drive period of time after a user have stop establishing the free-drive mode signal.

In an embodiment of the method according to the second aspect of the invention, the method comprises the steps of:
- by a user establishing a restart free-drive mode signal;
- by the robot controller restarting at least one of the maintain free-drive period of time or the restart free-drive period of time based on the restart free-drive mode signal.

This provides the same effects and advantages as described previously (e.g. in application paragraphs 0056 and 0063) and ensures that a user at any time during the free-drive mode of operation manually can restart the maintain free-drive period of time or the restart free-drive period of time.

In an embodiment of the method according to the second aspect of the invention, the method comprises the step of:
- by the robot controller leaving the free-drive mode of operation upon receiving a free-drive deactivation signal.

This provides the same effects and advantages as described previously (e.g. in application paragraph 0066) and ensures that that the user at any time during operation of the robot arm is able to return to a different mode of operation than the free-drive mode of operation.

In an embodiment of the method according to the second aspect of the invention, the method comprises the step of:
- by the robot controller providing robot feedback to the user, where the robot feedback is provided based on at least one of the remainder of the predetermined maintain free-drive period of time and the remainder of the restart maintain free-drive period of time.

This provides the same effects and advantages as described previously (e.g. in application paragraph 0067) and ensures that the user can be informed that the maintain free-drive period of time and/or the restart free-drive period of time is/are about to expire and/or inform the user how long time there is left of the maintain free-drive period of time and/or the restart free-drive period of time.

Third Aspect of the Present Invention

The above described limitations with the prior art or other problems of the prior art are also address by a robot controller, robot arm and method according to a third aspect of the present invention. This paragraph is referred to as application paragraph 0075 below.

According to the third aspect (where this paragraph and the following text until application paragraph 0077 below are referred to as application paragraph 0076 below), the invention relates to a robot controller for controlling a robot arm, the robot controller is switchable from a current mode of operation into a free-drive mode of operation, where the robot controller in the free-drive mode of operation is configured to:
- maintain the robot arm in a static posture when only gravity is acting on the robot arm;
- allow change in posture of the robot arm when an external force different from gravity is applied to the robot arm;
wherein the free-drive mode of operation is activatable by a user establishing a free-drive mode signal to the robot controller; where
the robot controller is configured to switch to the free-drive mode of operation upon receiving the free-drive mode signal and the robot controller is in the free-drive mode of operation configured to:
- monitor a value of at least one joint sensor parameter, and
- compare the value of the at least one joint sensor parameter to at least one free-drive operation joint sensor parameter threshold value;
wherein the robot controller is configured for maintaining the robot arm in the free-drive mode of operation if the value of the at least one joint sensor parameter does not exceed the at least one free-drive operation joint sensor parameter threshold value, wherein the free-drive operation joint sensor parameter threshold value is defined as a virtual three-dimensional geometric shape surrounding a part of the robot arm and the robot controller is configured for maintaining the robot arm in the free-drive mode of operation if the value of the at least one joint sensor parameter does not exceed the virtual three-dimensional geometric shape surrounding a part of the robot arm within at a free-drive safety period.

The virtual three-dimensional geometric shape can be any shape defining a boundary around a part of the robot arm, within which the part of the robot arm is allowed to move within the free-drive safety period of time. This is advantageous in that it has the effect that apart of the robot arm in the free-drive mode of operation within the free-drive safety period only can move within the virtual three-dimensional geometric shape. Situations where the part of the robot arm moves in an unsafe manner can hereby be avoided as the part of the robot arm only can move within a limited space. Consequently, hazardous movements cause by wrongly entered payload to the robot controller can be avoided as the robot controller can be configured to leave the free-drive mode of operation if the part of the robot exceeds the virtual dimensional geometric shape within the free-drive safety period. However, a user will in a controlled manner be able to manually move the part of the robot arm within the virtual three-dimensional space. The free-drive safety period of time can be any time period within which the part of the robot arm is allowed to move within the virtual three-dimensional space without creating hazards situations. The free-drive safety period can be predefined and/or dynamically configured for instance based on the posture of the robot arm, the size of the three-dimensional geometric shape and/or a maximum average speed. The maximum average speed can for instance indicate the maximum average speed that the part of the robot arm is allowed to have from the start of the free-drive mode and to the point in time where the part of the robot arm reaches the boundary of the virtual three-dimensional space. The maximum average speed can for instance be defined as a speed at which the part of the robot can move without causing damage to persons near the robot arm, as known in the art of robot safety allowed moving speeds of robot arms depends on the mass of the moving parts, the shape, the size of impact points, the body part of the human that may be hit by the robot arm. A none limiting illustrating example, if at the beginning of the free-drive mode the distance from the part of the robot arm to the boundary of the virtual three-dimensional space is 10 cm and the part of the robot arm is allowed to move at a speed of 50 cm/sec. then the free-drive safety period would be 0.2 sec. The virtual three-dimensional geometric shape can surround the tool flange and define a boundary wherein the tool flange is allowed to move during a the free-drive safety period of time. It is to be understood that the virtual three-dimensional geometric shape can have any shape for instance a sphere, an ellipsoid, a cube, a cuboid, a cylinder, a pyramid, a polyhedron or any arbitrary three-dimensional shape. The virtual three-dimensional geometric shape can be predefined and/or dynamically configured for instance based on the posture of the robot arm. The part of the robot arm surrounded by the virtual three-dimensional shape may in one embodiment be arranged at the center of the virtual three-dimensional geometric shape as this allows the part of the robot arm to move symmetrical within the virtual three-dimensional geometric shape; however, it is noted that the part of the robot arm can be arranged at any position within the virtual three-dimensional shape. The user can thereby manipulate the robot arm in free-drive mode of operation with both hands in a safe manner and without the need of continuously establishing a free-drive signal e.g. by pushing a button. This paragraph is referred to as application paragraph 0077 below.

According to an embodiment of the third aspect of the invention, the position of the virtual three-dimensional geometric shape is fixed in relation to a reference point upon the robot controller switching to said free-drive mode of operation. The virtual three-dimensional geometrical shape can hereby be fixed in relation to a reference point when the robot controller is switched into free-drive mode of operation and the part of the robot arm is then allowed to move within a three-dimensional space defined in relation to the reference point, where the three-dimensional space is defined by the virtual three-dimensional space. The reference point may be any point in relation to the robot arm and can for instance be defined in relation to a moving part of the robot arm, such as a tool flange, a wrist joint, an elbow joint, a shoulder joint, a robot link; a fixed part of the robot arm such as the base joint, which is fixed in relation to the surroundings of the robot arm or a fixed point in the surroundings of the robot arm, such as a table, a work station, pick up point, conveyer, etc. This paragraph is referred to as application paragraph 0078 below.

According to an embodiment of the third aspect of the invention the robot controller is configured to define the position of the virtual three-dimensional geometric shape in relation to a reference point based on the position of a part of said robot arm in relation to a fixed point. This makes it possible to define the position of the virtual three-dimensional geometric shape in relation to a fixed point, based on the position of the part of the robot arm surrounded by the virtual three-dimensional geometric shape. For instance, the virtual three-dimensional space may surround the tool flange of the robot arm and the position of the three-dimensional geometric shape may be defined based on the tool flange's position in relation to the robot base, where the robot base constitutes the fixed point. This paragraph is referred to as application paragraph 0079 below.

According to an embodiment of the third aspect of the invention, the position of the virtual three-dimensional geometric shape in relation to a reference point of the robot arm is redefined during said free-drive mode of operation. The position of the virtual three-dimensional geometrical shape in relation to a reference point can hereby be redefined during the free-drive mode of operation. Hereby it is possible to redefine the position of the three-dimensional space in relation to the reference point during free-drive mode of operation, which makes it possible to move the part of the robot arm stepwise or gradually around in the surroundings of the robot arm. The reference point may be any point in relation to the robot arm and can for instance at any time during the free-drive mode of operation be defined as the position of a part of the robot arm in relation to a fixed point. For instance, the virtual three-dimensional space may surround the tool flange of the robot arm and can at any time during the free-drive mode of operation be fixed in relation to the tool flange's position in relation to the robot base. The time at which the position of the virtual three-dimensional geometrical shape in relation to a reference point can for instance be defined by a redefine position period of time. The redefine position period of time can for instance define a time period starting when the robot controller is switch into free-drive mode of operation or starting when the position of the virtual three-dimensional geometrical shape in relation to a reference point have been redefined. The redefine position period of time can for instance have the same length as the free-drive safety period of time and the robot controller can thus be configured to redefine the position of the virtual three-dimensional geometric shape in relation to a reference point of the robot arm upon expiry of the free-drive safety period and if the value of the at least one joint sensor parameter has not exceeded the virtual three-dimensional geometric shape surrounding a part of the robot arm within the free-drive safety period. This makes it possible to step wise or gradually move the part of the robot arm into positions beyond the initial boundary defined by the virtual three-dimensional geometrical shape, as the position of the virtual three-dimensional space can be redefined if the part of the robot arm has not exceeded the boundary of the virtual three-dimensional space within the free-drive safety period of time. In other words, the position of the three-dimensional space within which the part of the robot arm is allowed to move can be stepwise or gradually moved in relation to a reference point. This paragraph is referred to as application paragraph 0080 below.

According to an embodiment of the third aspect of the invention, the robot controller is configured to define the position of the virtual three-dimensional geometric shape in relation to a reference point based on a plurality of positions of the part of the robot arm in relation to a fixed point, where the plurality of positions of the part of the robot arm have been obtained at different points in time. This makes it possible to ensure that the position of the visual three-dimensional geometric shape stepwise or gradually can move during the free-drive mode of operation. Consequently, a user can stepwise or gradually move the part of the robot arm to positions which upon switching into free-drive mode of operation were outside the boundaries defined by the virtual three-dimensional space. For instance, the position of the virtual three-dimensional geometric can be defined as the average position of a part of the robot arm with in an average position period of time, where the average position of the part of the robot arm has been obtained based on a plurality of positions of the part of the robot arm obtained within the average position period of time. This paragraph is referred to as application paragraph 0081 below.

According to an embodiment of the third aspect of the invention, the robot controller is configured to provide robot feedback to the user upon determining if the value of the at least one joint sensor parameter is within a feedback value relating to the virtual three-dimensional geometric shape. This makes it possible to provide robot feedback to the user when the user have move the part of the robot arm to a position near the boundary defined by the virtual three-dimensional space such that the value of the joint sensor parameter is about to exceed said virtual three-dimensional geometric shape. The robot feedback can be provided as any signal perceptible by a user such as an audio signal, a visual signal, a haptic feedback, a predetermined posture of one or more joints, predetermined movements of one or more joints or combinations thereof. Consequently, the user will be warned that the robot arm has been moved close to the boundaries and is close to a position where the robot controller will leave the free-drive mode of operation, and the user can then counter act that this happens by stop moving the robot arm in the direction towards the boundary. This can be achieved by comparing the value of the at least one joint sensor parameter to the feedback value relating to the virtual three-dimensional geometric shape, where the feedback value can be provided as a threshold value having a lower value than the free-drive operation joint sensor parameter threshold value. This paragraph is referred to as application paragraph 0082 below.

According to an embodiment of the third aspect of the invention, the robot feedback is provided as a robot force provided by a part of the robot arm, where the robot force is provided in a direction away from the virtual three-dimensional geometric shape. The user can hereby sense that the part of the robot arm is approaching the boundary defined by the virtual three-dimensional shape as an increase in moving resistance of the robot arm. This can be achieved by configuring the robot are to control the motor torque provided to the joint motors. The robot controller can also be contributed to increase the size of the robot force as the value of the joint sensor parameter approaches the virtual-dimensional geometric shape. Consequently, the user will sense a larger resistance the closer the robot arm is the boundary defined by the virtual three-dimensional shape. This paragraph is referred to as application paragraph 0083 below.

Moreover, according to the third aspect, the invention relates to a robot arm comprising a plurality of robot joints connecting a robot base and a robot tool flange; each of the robot joints comprises:
 an output flange rotatable in relation to a robot joint body,
 a joint motor configured to rotate the output flange,
 at least one joint sensor providing a sensor signal indicative of at least one of an angular position of the output flange, an angular position of a shaft of the joint motor, a motor current of the joint motor.

The robot arm comprises at least one robot controller configured to control the robot joints by controlling the motor torque provided by the joint motors based on the sensor signal and the robot controller is further configured as described in any one of application paragraphs 0075 to 0083 and or as illustrated in the figures and the corresponding description of the figures.

Moreover according to the third aspect, the invention relates to a method of operating a robot arm in free-drive mode of operation, where the robot arm by a robot controller has been switched into the free-drive mode of operation upon the robot controller receiving a free-drive activating signal established by a user, wherein the free-drive mode of operation comprises the steps of:
 maintaining the robot arm in a static posture when only gravity is acting on the robot arm;
 changing posture of the robot arm when an external force different from gravity is applied to the robot arm;
 by the robot controller monitor a value of at least one joint sensor parameter;
 by the robot controller compare the value of the at least one joint sensor parameter to at least one free-drive operation joint sensor parameter threshold value; wherein the free-drive operation joint sensor parameter threshold value is defined as a virtual three-dimensional geometric shape surrounding a part of the robot arm;
 by the robot controller maintaining the robot arm in the free-drive mode of operation if the value of the at least one joint sensor parameter does not exceed the virtual three-dimensional geometric shape surrounding a part of the robot arm within a free-drive safety period.

This provides the same effects and advantages as described previously (e.g. in application paragraphs 0076 and 0077) and makes it possible to avoid situations where a part of the robot arm moves in an unsafe manner. Consequently, hazardous movements cause by wrongly entered payload to the robot controller can be avoided as the robot controller can be configured to leave the free-drive mode of operation if the part of the robot exceeds the virtual dimensional geometric shape within the free-drive safety period. A user can thereby manipulate the robot arm in free-drive mode of operation with both hands in a safe manner and without the need of continuously establishing a free-drive signal e.g. by pushing a button.

According to an embodiment of the third aspect of the invention, the method comprises a step of fixing the position of the virtual three-dimensional geometric shape in relation to a reference point upon receiving the free-drive mode signal. Also, the method may comprises a step of: during the free-drive mode of operation redefining the position of the virtual three-dimensional geometric shape in relation to a reference point. This provides the same effects and advantages as described previously (e.g. in application paragraphs 0078 to 0081) and makes it possible for the user to step wise or gradually move the robot arm into positions beyond the initial boundary defined by the virtual three-dimensional geometrical shape.

According to an embodiment of the third aspect of the invention, the method comprises a step of by the robot controller providing robot feedback to the user upon determining if the value of the at least one joint sensor parameter is within a feedback value relating to the virtual three-dimensional geometric shape. The step of providing robot feedback to the user may comprise a step of providing a robot force by at least a part of the robot arm, where the robot force is provided in a direction away from the virtual-dimensional geometric shape. Also, the step of providing the robot force may comprise a step of increasing the robot force as the value of the joint sensor parameter approaches the virtual-dimensional geometric shape. This provides the same effects and advantages as described previously (e.g. in application paragraphs 0082 and 0083) and makes it possible to provide feedback to the user that the robot arm is about to leave the free-drive mode of operation.

It is noted that the embodiments of the various aspects of the present invention as described previously may be combined in any order or combination. Hereby further advantages and effects can be provided. For instance, a combination of the embodiments of the first aspect of the invention and the second aspect of the invention results in the effect at a user can activate free drive mode of operation directly at the robot arm in order to manipulate the robot arm in free-drive mode of operation using both hands. The combinations of the embodiments of the first aspect of the invention and the third aspect of the invention results in the effect at a user can activate free drive mode of operation directly at the robot arm in order to manipulate the robot arm and in the free-drive mode of operation safely move the robot around without risk of hazardous movements for instance due to changing payload during the free-drive mode of operation. The combinations of the embodiments of the second aspect of the invention and the third aspect of the invention results in the effect that the user can move the robot arm in free-drive mode of operation using both hands without risk of hazardous movements for instance due to changing payload during the free-drive mode of operation. The combinations of the embodiments of the first, second and third aspect of the invention results in the fact that a robot arm can be provided with a safe and user-friendly free-drive mode of operation where the user safely activate the free-drive mode of operation and thereafter move the robot arm using both hands in a safe a reliable manner.

Further and additional advantages and benefits of the present invention may be described in the detailed description of the invention.

BRIEF DESCRIPTION OF THE DRAWINGS

For a more complete understanding of this disclosure, reference is now made to the following brief description, taken in connection with the accompanying drawings and detailed description.

DETAILED DESCRIPTION OF THE INVENTION

The present invention is described in view of exemplary embodiments only intended to illustrate the principles of the present invention. The skilled person will be able to provide several embodiments within the scope of the claims. Throughout the description, the reference numbers of similar elements providing similar effects have the same last two digits. Further it is to be understood that in the case that an embodiment comprises a plurality of the same features then only some of the features may be labeled by a reference number.

Figure 1:
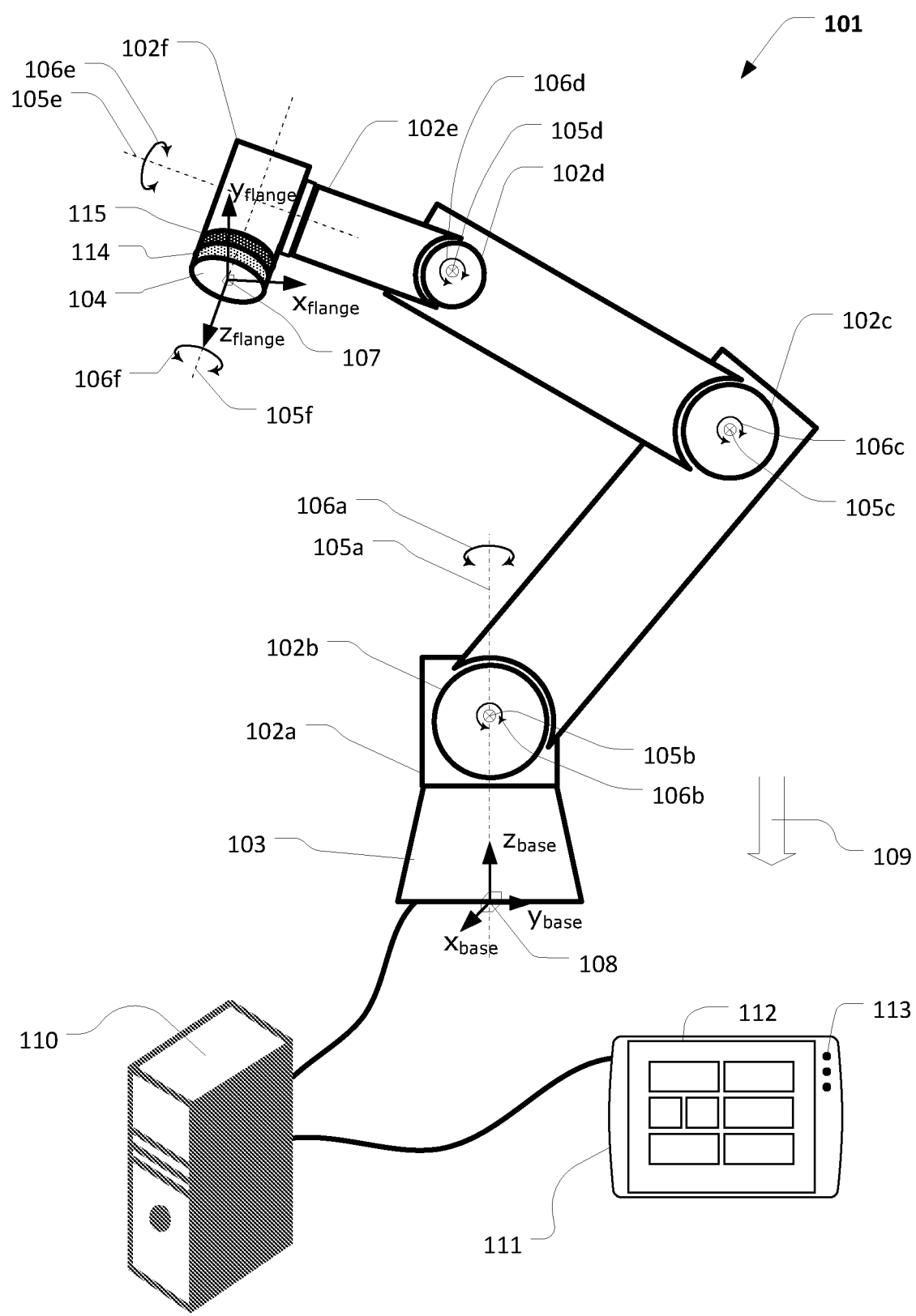
FIG. 1 illustrates a robot arm according to the present invention.

FIG. 1 illustrates a robot arm 101 comprising a plurality of robot joints 102a, 102b, 102c, 102d, 102e, 102f connecting a robot base 103 and a robot tool flange 104. A base joint 102a is configured to rotate the robot arm around a base axis 105a (illustrated by a dashed dotted line) as illustrated by rotation arrow 106a; a shoulder joint 102b is configured to rotate the robot arm around a shoulder axis 105b (illustrated as a cross indicating the axis) as illustrated by rotation arrow 106b; an elbow joint 102c is configured to rotate the robot arm around an elbow axis 105c (illustrated as a cross indicating the axis) as illustrated by rotation arrow 106c, a first wrist joint 102d is configured to rotate the robot arm around a first wrist axis 105d (illustrated as a cross indicating the axis) as illustrated by rotation arrow 106d and a second wrist joint 102e is configured to rotate the robot arm around a second wrist axis 105e (illustrated by a dashed dotted line) as illustrated by rotation arrow 106e. Robot joint 102f is a tool joint comprising the robot tool flange 104, which is rotatable around a tool axis 105f (illustrated by a dashed dotted line) as illustrated by rotation arrow 106f. The illustrated robot arm is thus a six-axis robot arm with six degrees of freedom with six rotational robot joints, however it is noticed that the present invention can be provided in robot arms comprising less or more robot joints and also other types of robot joints such as prismatic robot joints providing a translation of parts of the robot arm for instance a linear translation.

A robot tool flange reference point 107 also known as a TCP is indicated at the robot tool flange and defines the origin of a tool flange coordinate system defining three coordinate axis $x_{flange}$, $y_{flange}$, $z_{flange}$. In the illustrated embodiment the origin of the robot tool flange coordinate system has been arrange on the tool flange axis 105f with one axis ($z_{flange}$) parallel with the tool flange axis and with another axis $x_{flange}$, $y_{flange}$ parallel with the outer surface of the robot tool flange 104. Further a base reference point 108 is coincident with the origin of a robot base coordinate system defining three coordinate axis $x_{base}$, $y_{base}$, $z_{base}$. In the illustrated embodiment the origin of the robot base coordinate system has been arrange on the base axis 105a with one axis ($z_{base}$) parallel with the base axis 105a axis and with another axis $x_{base}$, $y_{base}$ parallel with at the bottom surface of the robot base. The direction of gravity 109 in relation to the robot arm is also indicated by an arrow and it is to be understood that the robot arm can be arrange at any position and orientation in relation to gravity only limited by the freedom of operation of the robot joints.

The robot arm comprises at least one robot controller 110 configured to control robot arm 101 and can be provided as a computer comprising in interface device 111 enabling a user to control and program the robot arm. The controller can be provided as an external device as illustrated in FIG. 1 or as a device integrated into the robot arm or as a combination thereof. The interface device can for instance be provided as a teach pendent as known from the field of industrial robots which can communicate with the controller via wired or wireless communication protocols. The interface device can for instanced comprise a display 112 and a number of input devices 113 such as buttons, sliders, touchpads, joysticks, track balls, gesture recognition devices, keyboards etc. The display may be provided as a touch screen acting both as display and input device. The interface device can also be provided as an external device configured to communicate with the robot controller, for instance as smart phones, tablets, PCs, laptops, etc. The interface device can be a teach pendent or handle or smartphone communicating wired or wireless with the robot controller.

The robot tool flange 104 comprises a force-torque sensor 114 (sometimes referred to simply as fore sensor) integrated into the robot tool flange 104. The force-torque sensor 114 provides a tool flange force signal indicating a force-torque provided at the robot tool flange. In the illustrated embodiment the force-torque sensor is integrated into the robot tool flange and is configured to indicate the forces and torques applied to the robot tool flange in relation to the robot tool flange reference point 107. The force-torque sensor 114 provides a force and torque signal indicating a force and torque provided at the tool flange. In the illustrated embodiment the force-torque sensor is integrated into the robot tool flange and is configured to indicate the forces-torque applied to the robot tool flange in relation to the reference point 107 and in the tool flange coordinate system. However, the force-torque sensor can indicate the force-torque applied to the robot tool flange in relation to any point which can be linked to the robot tool flange coordinate system. In one embodiment the force-torque sensor is provided as a six-axis force-torque sensor configured to indicate the forces along and the torques around three perpendicular axis. The force-torque sensor can for instance be provided as any force-torque sensor capable of indicating the forces and torques in relation to a reference point for instance any of the force torque sensors disclosed by WO2014/110682A1, U.S. Pat. No. 4,763,531, US 2015204742. However, it is to be understood that the force sensor in relation to the present invention not necessarily need to be capable of sensing the torque applied to the tool flange. It is noted that the force-torque sensor may be provided as an external device arranged at the robot tool flange or omitted.

An acceleration sensor 115 is arranged at the robot tool joint 102f and is configured to sense the acceleration of the robot tool joint 102f and/or the acceleration of the robot tool flange 104. The acceleration sensor 115 provides an acceleration signal indicating the acceleration of the robot tool joint 102f and/or the acceleration of the robot tool flange 104. In the illustrated embodiment the acceleration sensor is integrated into the robot tool joint and is configured to indicate accelerations of the robot tool joint in the robot tool coordinate system. However, the acceleration sensor can indicate the acceleration of the robot tool joint in relation to any point which can be linked to the robot tool flange coordinate system. The acceleration sensor can be provided as any accelerometer capable of indicating the accelerations of an object. The acceleration sensor can for instance be provided as an IMU (Inertial Measurement Unit) capable of indicating both linear acceleration and rotational accelerations of an object. It is noted that the acceleration sensor may be provided as an external device arranged at the robot tool flange or omitted.

Each of the robot joints comprises a robot joint body and an output flange rotatable or translatable in relation to the robot joint body and the output flange is connected to a neighbor robot joint either directly or via an arm section as known in the art. The robot joint comprises a joint motor configured to rotate or translate the output flange in relation to the robot joint body, for instance via a gearing or directly connected to the motor shaft. The robot joint body can for instance be formed as a joint housing and the joint motor can be arranged inside the joint housing and the output flange can extend out of the joint housing. Additionally, the robot joint comprises at least one joint sensor providing a sensor signal indicative of at least one of the following parameters: an angular and/or linear position of the output flange, an angular and/or linear position of the motor shaft of the joint motor, a motor current of the joint motor or an external force and/or torque trying to rotate the output flange or motor shaft. For instance, the angular position of the output flange can be indicated by an output encoder such as optical encoders, magnetic encoders which can indicate the angular position of the output flange in relation to the robot joint. Similarly, the angular position of the joint motor shaft can be provided by an input encoder such as optical encoders, magnetic encoders which can indicate the angular position of the motor shaft in relation to the robot joint. It is noted that both output encoders indicating the angular position of the output flange and input encoders indicating the angular position of the motor shaft can be provided, which in embodiments where a gearing have been provided makes it possible to determine a relationship between the input and output side of the gearing. The joint sensor can also be provided as a current sensor indicating the current through the joint motor and thus be used to obtain the torque provided by the motor. For instance, in connection with a multiphase motor, a plurality of current sensors can be provided in order to obtain the current through each of the phases of the multiphase motor. It is also noted that some of the robot joints may comprise a plurality of output flanges rotatable and/or translatable by joint actuators, for instance one of the robot joints may comprise a first output flange rotating/translating a first part of the robot arm in relation to the robot joint and a second output flange rotating/translating a second part of the robot arm in relation to the robot joint. As indicated above, the joint sensor can also be provided as a force and/or torque sensor or acceleration sensor. Such force and/or torque and acceleration sensor may be part of the outmost joint as indicated on FIG. 1, however the other parts of the robot arm may also comprise force/torque sensors.

The robot controller is configured to control the motions of the robot arm by controlling the motor torque provided to the joint motors based on a dynamic model of the robot arm, the direction of gravity acting 109 and the sensor signal.

Figure 2:
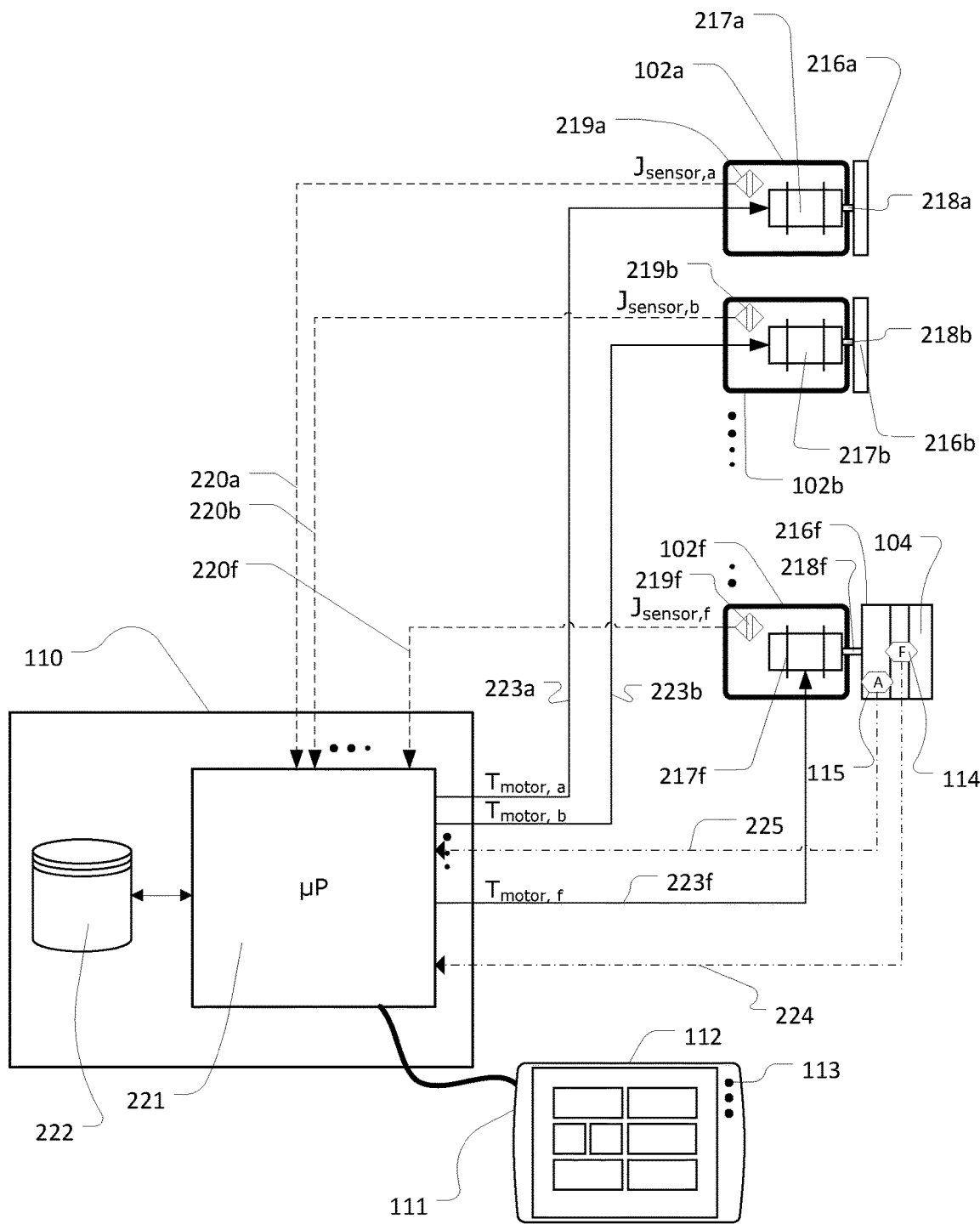
FIG. 2 illustrates a simplified structural diagram of the robot arm.

FIG. 2 illustrates a simplified structural diagram of the robot arm illustrated in FIG. 1. The robot joints 102a, 102b and 102f have been illustrated in structural form and the robot joints 102c, 102d, 102e and the robot links connecting the robot joints have been omitted for the sake of simplicity of the drawing. Further the robot joints are illustrated as separate elements however it is to be understood that they are interconnected either directly or via robot links as illustrated in FIG. 1. The robot joints comprise an output flange 216a, 216b, 216f and a joint motor 217a, 217b, 217f or another kind of actuator, where the output flange 216a, 216b, 216f is rotatable in relation to the robot joint body. The joint motors 217a, 217b, 217f are respectively configured to rotate the output flanges 216a, 216b, 216f via an output axle 218a, 218b, 218f. It is to be understood that the joint motor or joint actuator may be configured to rotate the output flange via a transmission system such as a gear (not shown). In this embodiment the output flange 216f of the tool joint 123f constitutes the tool flange 104. At least one joint sensor 219a, 219b, 219f providing a sensor signal 220a, 220b, 220f indicative of at least one joint sensor parameter $J_{sensor,a}$, $J_{sensor,b}$, $J_{sensor,f}$ of the respective joint. The joint sensor parameter can for instance indicate a pose parameter indicating the position and orientation of the output flange in relation to the robot joint body, an angular position of the output flange, an angular position of a shaft of the joint motor, a motor current of the joint motor. The joint sensor parameter is selected from the list comprising: speed, acceleration, torque, motor torque, force and position. The joint sensor parameters can be measures obtained from sensors or values derived from such sensor values. For instance, the angular position of the output flange can be indicated by an output encoder such as optical encoders, magnetic encoders which can indicate the angular position of the output flange in relation to the robot joint. Similar, the angular position of the joint motor shaft can be provided by an input encoder such as optical encoders, magnetic encoders which can indicate the angular position of the motor shaft in relation to the robot joint.

The motor currents can be obtained and indicated by current sensors. The robot controller 110 comprises a processer 221 and memory 222 and is configured to control the joint motors of the robot joints by providing motor control signals 223*a*, 223*b*, 223*f* to the joint motors. The motor control signals 223*a*, 223*b*, 223*f* are indicative of the motor torque $T_{motor,a}$, $T_{motor,b}$ and $T_{motor,f}$ that each joint motor shall provide to the output flanges and the robot controller is configured to determine the motor torque based on a dynamic model of the robot arm as known in the prior art. The dynamic model makes it possible for the controller to calculate which torque the joint motors shall provide to each of the joint motors to make the robot arm perform a desired movement. The dynamic model of the robot arm can be stored in the memory 222 and be adjusted based on the joint sensor parameters $J_{sensor,a}$, $J_{sensor,b}$, $J_{sensor,f}$. For instance, the joint motors can be provided as multiphase electromotors and the robot controller can be configured to adjust the motor torque provided by the joint motors by regulating the current through the phases of the multiphase motors as known in the art of motor regulation.

Robot tool joint 102*f* comprises the force-torque sensor 114 providing a tool flange force-torque signal 224 indicating a force-torque $FT_{flange}$ provided to the tool flange. For instance, the force signal-torque $FT_{flange}$ can be indicated as a force vector $\overrightarrow{F_{sensor}^{flange}}$ and a torque vector $\overrightarrow{T_{sensor}^{flange}}$ in the robot tool flange coordinate system:

$$\overrightarrow{F_{sensor}^{flange}} = \begin{pmatrix} F_{x,sensor}^{flange} \\ F_{y,sensor}^{flange} \\ F_{z,sensor}^{flange} \end{pmatrix} \quad \text{eq. 1}$$

where $F_{x,sensor}^{flange}$ is the indicated force along the $x_{flange}$ axis, $F_{y,sensor}^{flange}$ is the indicated force along the $y_{flange}$ axis and $F_{z,sensor}^{flange}$ is the indicated force along the $z_{flange}$ axis. The torque can be indicated as a torque vector in the robot tool flange coordinate system:

$$\overrightarrow{T_{sensor}^{flange}} = \begin{pmatrix} T_{x,sensor}^{flange} \\ T_{y,sensor}^{flange} \\ T_{z,sensor}^{flange} \end{pmatrix} \quad \text{eq. 2}$$

where $T_{x,sensor}^{flange}$ is the indicated torque around the $x_{flange}$ axis, $T_{y,sensor}^{flange}$ is the indicated torque around the $y_{flange}$ axis and $T_{z,sensor}^{flange}$ is the indicated torque around the $z_{flange}$ axis. It is noted that the force vector and torque vector can be provided as separate signals and that a separate force sensor and/or torque sensor can be provided.

Robot tool joint 102*f* may comprise the acceleration sensor 115 providing an acceleration signal 225 indicating the acceleration of the robot tool flange where the acceleration may be indicated in relation to the tool flange coordinate system $$\overrightarrow{A_{sensor}^{flange}} = \begin{pmatrix} A_{x,sensor}^{flange} \\ A_{y,sensor}^{flange} \\ A_{z,sensor}^{flange} \end{pmatrix}$$

where $A_{x,sensor}^{flange}$ is the sensed acceleration along the $x_{flange}$ axis, $A_{y,sensor}^{flange}$ is the sensed acceleration along the $y_{flange}$ axis and $A_{z,sensor}^{flange}$ is the sensed acceleration along the $z_{flange}$ axis.

In an embodiment where the acceleration sensor is provided as a combined accelerometer/gyrometer (e.g. an IMU) the acceleration sensor can additionally provide an angular acceleration signal indicating the angular acceleration of the output flange in relation to the robot tool flange coordinate system, for instance as a separate signal (not illustrated) or as a part of the acceleration signal. The angular acceleration signal can indicate an angular acceleration vector $\overrightarrow{\alpha_{sensor}^{flange}}$ in the robot tool flange coordinate system $$\overrightarrow{\alpha_{sensor}^{flange}} = \begin{pmatrix} \alpha_{x,sensor}^{flange} \\ \alpha_{y,sensor}^{flange} \\ \alpha_{z,sensor}^{flange} \end{pmatrix} \quad \text{eq. 3}$$

where $\alpha_{x,sensor}^{flange}$ is the angular acceleration around the $x_{flange}$ axis, $\alpha_{y,sensor}^{flange}$ is the angular acceleration around the $y_{flange}$ axis and $\alpha_{z,sensor}^{flange}$ is the angular acceleration around the $z_{flange}$ axis.

The force-torque sensor and acceleration sensor of the illustrated embodiment are arranged at the robot tool joint 102*f*; however, it is to be understood that the force-torque sensor and acceleration sensor can be arrange at any part of the robot arm and in some embodiments be omitted.

The robot controller is switchable into a free-drive mode of operation, where the robot controller in the free-drive mode of operation is configured to:

maintain the robot arm in a static posture when only gravity 109 is acting on the robot arm;

allow change in posture of the robot arm when an external force different from gravity is applied to the robot arm.

When only gravity is acting on the robot arm, the robot controller can be configured to maintain the robot arm in a static posture by driving the joint motors at a state where they provide sufficient motor torque to overcome gravity without moving parts of the robot arm. The robot controller can be configured to determine the sufficient motor torque based on the dynamic model of the robot arm at the static posture. The static posture can for instance be indicated by joint sensors provided as output encoders indicating the angular position of the output flange and/or input encoders indicating the angular position of the motor shaft. The static posture can also be stored as a posture in the control software for instance by defining the joint angles of the robot joints at the static posture. In case the static posture of the robot arm is stored, the stored posture may be referred to as a way point posture to which the robot arm returns or moves to/through when operating in a robot program.

When an external force different from gravity is applied to the robot arm, the robot controller can allow change in posture by driving the joint motors with a motor torque that allows a user to rotate the output flanges of the robot joint. For instance, the robot controller can be configured to drive the motor with a motor torque sufficient for maintaining the robot arm in the static posture, and an additional force and/or torque applied to the robot arm will thus overcome the sufficient motor torque, whereby the output flange of the joints will rotate due to the additional force and/or torque. During change of the robot arm posture the robot controller can be configured to adjust the sufficient motor torque based on the changes in posture resulting in the effect that the robot arm will be maintained in the new static posture when the additional external force is reduced.

In the free-drive mode of operation, the robot controller can in one embodiment be configured to control the motor torque of the joint motors based on the force signal 224 from the force-torque sensor 114. This makes it possible for the user to move the tool flange without manipulating each of the robot joints, for instance by pushing, pulling or rotating the robot tool flange. Additionally, in the free-drive mode of operation according to the present invention the user can also choose to manipulate the individual robot joints to change the posture of the robot arm. Consequently, the user is provided with a larger flexibility and options when changing the posture of the robot arm in free-drive mode of operation.

Figure 3:
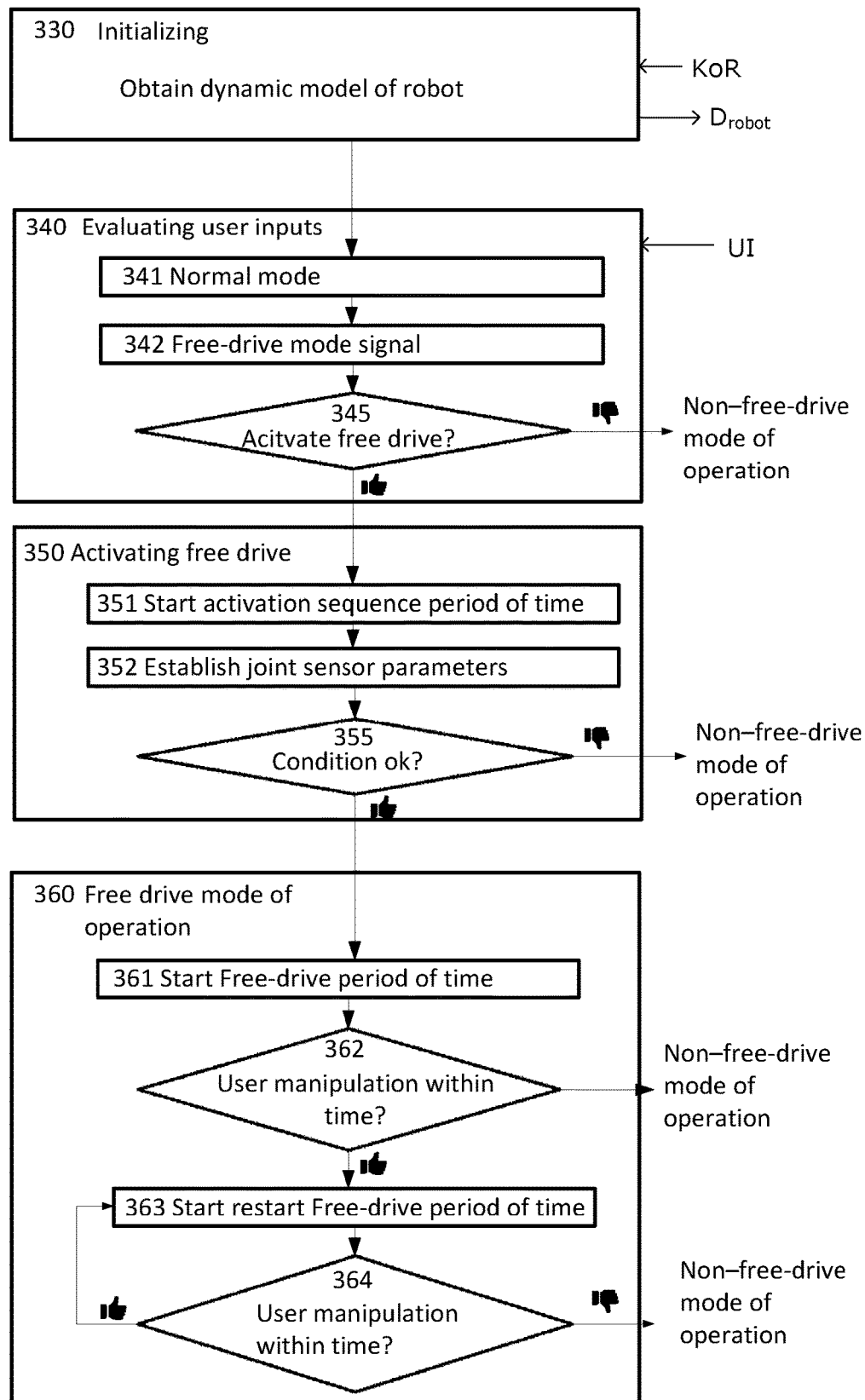
FIG. 3 illustrates a flow diagram of the method of changing the posture of a robot arm.
Figure 4:
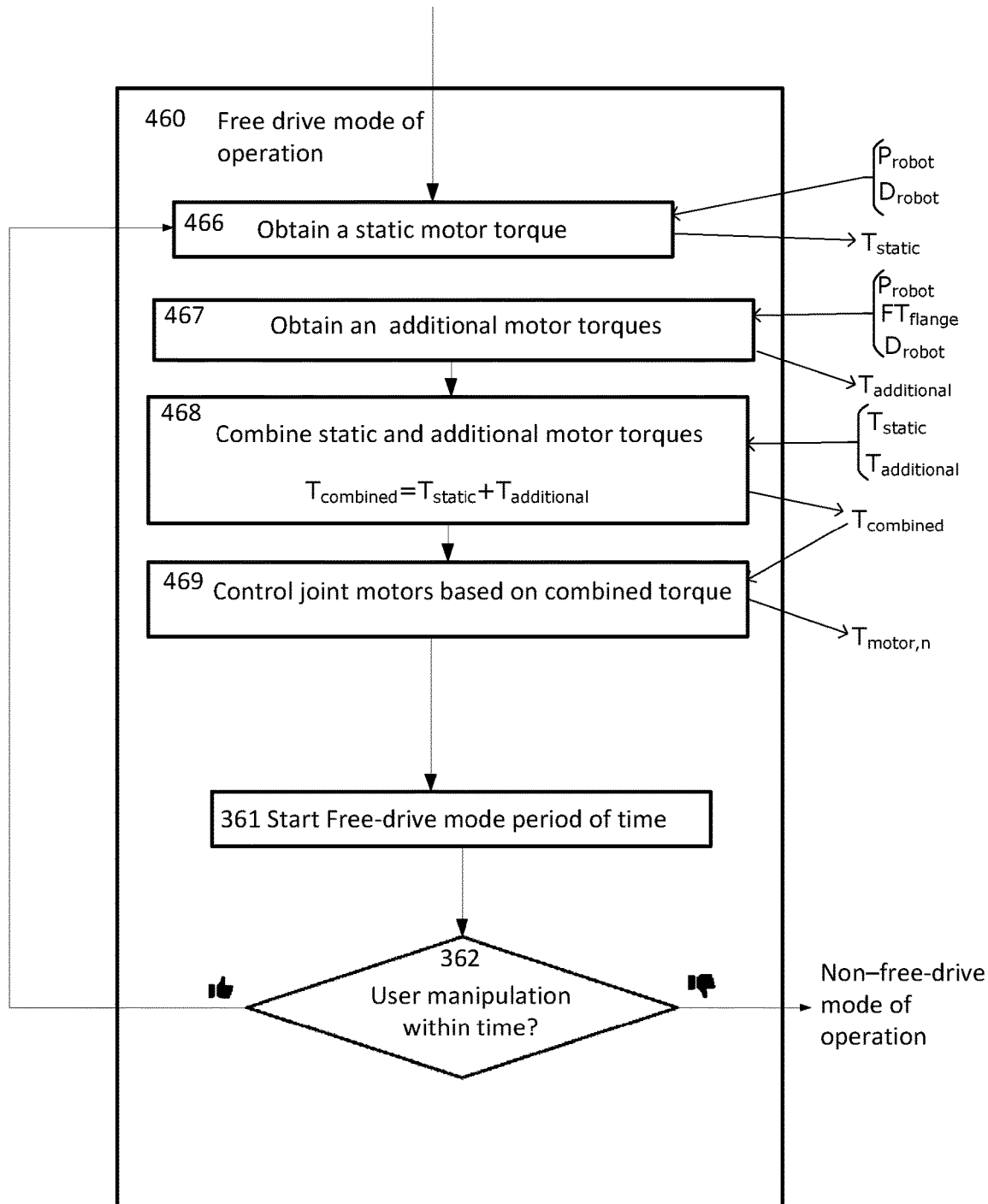
FIG. 4 illustrates a flow diagram of a method of changing posture of a robot arm in the free-drive mode of operation.

The robot controller 110 for controlling the robot arm 101 can be configured to perform the methods illustrated in FIG. 3-4.

FIG. 3 illustrates a flow diagram of a method of controlling a robot arm according to the present invention. The method comprises a step of initializing 330 comprising obtaining the dynamic model $D_{robot}$ of the robot arm, which can be based on prior knowledge of the robot arm, KoR, such as the dimensions and weight of robot joints and robot links; joint motor properties; information relating to an eventual payload attached to the robot arm, orientation of the robot arm in relation to gravity etc. The dynamic model of the robot arm can be defined and pre-stored in the memory of the controller and the user can in some embodiments be allowed to modify the dynamic model op the robot arm, for instance by providing payload information of a payload attached to the robot arm or defining the orientation of the robot arm in relation to gravity.

Step 340 is a step of evaluating user inputs to determine if the robot controller should change the current mode of operation to free-drive mode of operation. Step 341 is an optional step of changing the robot controller's current mode of operation to teach mode, if not already in teach mode, as in some embodiments the robot control can be configured only to enter free-drive mode of operation when in teach-mode of operation. However, it should be noted that free-drive mode of operation could be entered from other current modes of operation such as run/operation mode, however it would typically be entered from teach mode. In step 342 a user of the robot arm establishes a so-called free-drive activation signal for instance based on user inputs UI, and in step 345 it is determined if the process of activating the free-drive mode of operation of the robot arm should start (see step 350). Typically, the free-drive mode of operation is activated during programming of the robot arm for instance in order to allow a user to manually change the posture of the robot arm, e.g. in order to define waypoints/postures of the robot arm during a robot program.

The free-drive mode of operation can be activated based on a user input instructing the robot controller to activate the free-drive mode of operation. Thus step 340 can receive a user input, UI activating the free-drive mode of operation and enters the free-drive mode of operation, as indicated by a thumb up icon, if such user input is received and validated. If no user instructions to enter the free-drive mode of operation is received, the robot controller will, as indicated by a thumb down icon, not enter to free-drive mode of operation. The user input can be received through any input device capable of receiving user inputs for instance buttons, joysticks, touch screens, gesture recognition devices, sliders, sensors on the robot arm, etc. In one embodiment the free-drive mode of operation is activated based on a force-torque signal resulting in the fact that the user can activate the free-drive mode of operation directly at the robot arm simply by applying a force and/or torque to the robot arm. For instance, the force-torque signal can be provided as the force-torque signal 224 provided by the force-torque sensor 114 attached to the robot tool flange of the robot arm illustrated in FIGS. 1-2. Once the robot controller has entered the free-drive mode of operation (see step 360) the user input can indicate that the robot controller shall bring the robot arm out of free drive mode of operation. Bringing the robot arm out of the free-drive mode can happen automatically upon expiry of a defined time period or based on user input UI.

As mentioned, in step 342 a user of the robot arm establishes a so-called free-drive activation signal. The free-drive activation signal is provided from the user to the robot controller by the user applying a force to the robot arm or user interface. The force can be applied to a button or touch screen of the user interface or to a joint or sensor of the robot arm. No matter how and where the force is applied to the robot arm or user interface, it establishes an input to the robot controller referred to as the free-drive activation signal.

In an embodiment, to activate free-drive mode of operation, the free-drive activation signal has to be received continuously by the robot controller in a so-called activation period of time. The activation period of time is typically more than zero seconds and typical less than 10-15 seconds, suitable duration depends on e.g. the user, but would in many situations be between 0.25 second and 5 seconds such as 0.25 second, 0.5 second, 1 second or 2 seconds. With this the time period could be set to zero (or between zero and 0.25 second) if e.g. a simple comparison is made between two stored values of a parameter. Alternatively, the free-drive activation signal can be received by the robot controller as discrete signals in a predetermined pattern. This is mainly to ensure that the free-drive activation signal is not established by mistake. Therefore, the period of time should be long enough to identify non-user activation as such and only register activation from a user.

In an embodiment the free-drive activation signal is a logic "1" or "0" provided by pushing a button of the user interface. In an alternative embodiment the free-drive activation signal is a measured value of a joint sensor parameter or a derivable hereof such as a force, torque, temperature, electric potential, etc. Accordingly, the type of joint sensor parameter needed to establish the free-drive activation signal may be predetermined for the robot controller to be able to identify a free-drive activation signal. Alternatively, a specific input address of an I/O module connected to the robot controller can be used to identify a free-drive activation signal.

In an embodiment, in step 342, the user applies a force to a robot joint or to a force sensor to establish the free-drive activation signal. In this embodiment the force may be applied by pushing the force sensor in a predetermined orientation in space. The predetermined orientation may e.g. be an orientation perpendicular or parallel to a joint axis 105f. In case the predetermined orientation is perpendicular to the joint axis, an angle of the perpendicular force applied may also be established. Establishing an angle for the applied force facilitates the possibility for the robot controller to identify forces applied in a predetermined direction as potential free-drive activation signal. As indicated, any movement in space could in principle be used however, the mentioned perpendicular or parallel movements with respect to joint axis 105f is considered advantageous in that they are easier to remember and apply by a user.

Hence, it is possible not only to limit the free-drive activation signal to a specific type of joint sensor parameters, such as a force measured by the force sensor, but also to a specific direction of such force maintained in a predetermined activation period of time. Establishing the free-drive activation signal based on a force applied in the specified direction in a predetermined activation period of time i.e. e.g. in an angle which may be defined relative to the robot base or another part of the robot arm reduces the risk of the robot controller confuses forces not intended to establish the free-drive activation signal from forces that is intended to establish the free-drive activation signal.

An alternative method of establishing the free-drive activation signal is to apply a force in a direction which is not natural for the particular robot arm. An example hereof could be if a force change is measured (increased or decreased) without any change of e.g. motor current is applied by the robot controller and/or if no change is registered in relation to the payload.

Yet another alternative method of establishing the free-drive activation signal is to apply a torque to the torque sensor. Typically, a torque would also be a none natural force e.g. if the robot arm is in a static posture and where a static motor current applied to the motor. Such torque could be applied by a user using one or both hands to twist the torque sensor.

In step 345, the measured value (magnitude/size) of the force or torque applied to the robot arm is compared to a predefined threshold value. If the measured value is above the threshold value for the predetermined activation period of time, the robot controller is instructed to conclude, that a user is about to activate free-drive mode of operation. An additional test that may be performed in step 345 is if the direction of the measured force is as expected and/or if a value of a further joint sensor parameter is below a further predetermined threshold value.

This further threshold may be lower than the first threshold in that it is expected that a user applying a force in many situations also will apply a small torque. Hence, if a relatively high force is applied at the same time as a relatively small torque (or vice versa) it is an indication of an impact from a user. This can be evaluated by comparing the measured values of both the force (joint sensor parameter) and the torque (further joint sensor parameter) to respective threshold values. Thereby is established a further filter for ensuring that only a user's intentional force applied are interpreted by the robot controller as a the free-drive activation signal.

Alternatively, if the first joint sensor parameter is a force in a first direction, then the further joint sensor parameter may be a force applied in a second direction which is different from the first direction.

The first and further thresholds are typically defined by an upper or lower value for e.g. the magnitude/size of the force/torque but could also be defined as ranges between to endpoints. An appropriate force to be applied by a user to establish the free-drive activation signal could be below 50N such as e.g. 5N, 10N, 15N or 20N. The force has to be large enough not to be confused by a bump caused e.g. by a user and small enough for a user to be able to apply the force to the robot arm.

In step 350, the free-drive mode of operation is activated. In step 351, a so-called activation sequence period of time starts, in step 352, one or more joint sensor parameters are measured and in step 355, changes of the values of the one or more joint sensor parameters are compared to allowable changes. Hence, if changes are within an allowable range for the whole activation sequence period of time, the weight of the payload is assumed to be correct and the free-drive mode of operation is activated as indicated by thumb up and if not the robot controller switch to e.g. a non-freed-drive mode of operation such as protective stop mode or stays in the current mode of operation as indicated by thumb down.

As mentioned, in step 351, the activation sequence period of time starts. In an embodiment, this time period is between 0.25 second and 5 seconds such as 0.25 second, 0.5 second, 1 second or 2 seconds. With this the the time period could be set to zero (or between zero and 0.25 second) if e.g. a simple comparison is made between two stored values of a parameter half a second and 10-15 (or even more) seconds. If one or more joint sensor parameters does not within this period of time change more than allowed, free-drive mode of operation is entered.

The allowed changes may be defined by free-drive activation joint sensor parameter threshold values defining maximum speed, acceleration, displacement, position, force, torque, current, etc. These threshold values may be predetermined fixed values. However, they may also be dynamic in the sense that if e.g. acceleration of the robot arm in the activation sequence period of time is high, a threshold value for e.g. displacement of the robot arm or the time such acceleration is allowed is low whereas if the acceleration is low, the threshold value for the displacement or time is higher.

The free-drive activation joint sensor parameter threshold values may define a so-called virtual wall or virtual window defining a range around the center of the tool flange within which the tool flange is allowed to move; for instance, a plane in an orientation in space, a cube, sphere or other 3d shape. In case of e.g. a payload weight error, the robot tool flange (or payload) may move downward until it "hits" the virtual wall where it will stop and e.g. enter normal mode operation. The virtual wall can be reset so to speak by a user e.g. moving (lifting, lowering, displacing) the tool flange a predetermined distance. The user can for instance move the robot tool flange a predetermined distance away from the virtual window. By this, the virtual wall is reestablished now relative to the new position of the center of the tool flange. By applying an external force e.g. by moving (lifting, lowering, displacing) the tool flange the robot controller knows that it is a user applied force and therefore it is allowed to reestablish the virtual wall. In this way the tool flange can be moved down to the floor of the robot cell in subsequent steps. If the virtual wall was reached e.g. because the payload falls off a gripper tool, the gripper would hit the upper part of the virtual wall and stay there, as the robot arm in free-drive mode of operation tries to compensate for gravity's influence on the "missing payload", and the virtual wall would not be reestablished. In the latter example, if there were no virtual wall, the gripper would risk stopping first, when it hits its upper position e.g. standing upwardly in a straight pose. The user can then move the tool flange down to the floor of the robot cell in subsequent steps by lowering the tool flange whereby the controller establishes a new virtual wall. Opposite if the payload weighs more than known by the robot controller, the robot tool flange would move downward in the direction of gravity until it hits its lower position or the floor of the robot cell. This can be prevented by the virtual window, as the gripper would hit the lower part of the virtual wall and stay there, and the virtual wall would not be reestablished. The user can then move the tool flange to a desired position in subsequent steps by lifting the tool flange away from the lower part of the virtual window, whereby the controller establishes a new virtual wall.

The joint sensor parameter thresholds could be dynamic depending on different aspects of movement of the robot arm. Hence, maximum speed could be depending on time since movement started. I.e. if the robot arm has moved in substantially the same direction for more than x seconds, then maximum speed threshold is reduced to avoid drifting of the robot arm.

Further, the payload could define threshold value for speed and acceleration. I.e. if the user has registered a large payload (size or weight) the maximum speed and/or acceleration threshold is reduced to prevent the user in getting hazardous situations or to help maneuver a heavy robot.

Speed and acceleration could be limited by the force applied to the robot by the user (or payload). I.e. if the user pulls hard in the robot or the payload change weight, the robot could be limited to slow movements to protect user and/or payload. The same is true for torque, hence if the robot experiences large torque, the maximum angular speed could be reduced to prevent an off-axis payload facilitates unexpected fast rotation/acceleration of the tool flange.

Therefore, in step 352 values of one or more predetermined joint sensor parameters are obtained or established. Joint sensor parameters may as mentioned include speed, acceleration, torque, motor torque, force, etc. but also derivable hereof such as position and displacement of the robot arm in space. In an embodiment, the force and torque are measured at the tool flange. Further output from accelerometers received over time from a plurality of joints are used to calculate or derive angular speed, angular acceleration, speed and/or acceleration of the tool flange. Further current and/or voltage is measured in a plurality of joints e.g. the power supply to the joint motors.

Despite the intension of the free-drive mode of operation, the value of these joint sensor parameters and derivables hereof may change without additional force (additional motor torque $T_{additional}$) is applied to the robot arm by a user if e.g. the weight of the payload is not correct, sensors are not calibrated correct or sensors are drifting over time. Hence, one problem solved by the present invention is that measurements from sensors such as force torque sensors are drifting over time or as consequence of temperature changes and can therefore not be trusted. Instead, unexpected (from the robot controllers' point of view) measurements from torque/force sensors are more trustworthy.

As an example, could be mentioned that if the weight of the payload is lower than the weight provided to the robot controller (e.g. by a user), the static motor torque ($T_{static}$) calculated by the robot controller to maintain a static posture is too high leading to an upward movement of the robot arm. To avoid such movement to cause damage on material or persons, the robot controller in this situation stops the movement of the robot arm. Stop can be initiated e.g. by changing mode of operation to a protective or hard stop mode. In step 350, the stop is made within the activation sequence period of time and hence, free-drive mode of operation is not entered.

Alternatively, it can be done by compensating for the movement by reducing motor current to one or more joint motors until static posture of the robot arm is registered e.g. via joint sensor parameters.

It should be mentioned, that in some embodiments the joint/force sensors may only indicate the force applied by a user intending to enter free-drive mode and not register that force directly. For instance, a difference in encoder positions between input encoder and out encoder may be used to indicate than an external force is applied to the robot arm.

The evaluation of the measured joint sensor parameters is made in step 355. As mentioned, the evaluation may be implemented as a comparison of measured values of the joint sensor parameters to free-drive activation joint sensor parameter threshold values defining allowable changes of the measured values. As mentioned, these free-drive activation joint sensor parameter threshold values may be predetermined fixed values, however they may also be implemented as dynamic values and changed in response to e.g. speed of change of the values of the measured joint sensor parameters. By this evaluation, it is ensured that the free-drive mode of operation is only entered if this will not cause the robot arm to move with values of joint sensor parameters or derivables hereof outside the free-drive activation joint sensor parameter threshold values which could lead to hazardous situations for the user, the robot arm and its surroundings. A positive evaluation leading to change of mode of operation to free-drive mode of operation is indicated by the thumb up and a negative evaluation leading to e.g. staying in the current mode of operation (typically teach mode) or protective stop is indicated by thumb down.

In step 360, the robot arm is operated in the free-drive mode of operation and it is therefore possible for the user to manipulate the posture of the robot arm by applying a force to one or more parts of the robot arm.

In step 361, upon the positive evaluation described above leading to change of mode of operation into free-drive mode of operation, a free-drive period of time is started by the robot controller. In step 362, it is tested if the user manipulates the robot arm. If the user does not manipulate the robot arm, then after expiry of the free-drive mode period of time, the robot controller changes mode of operation to a non-free-drive mode of operation. In an embodiment, the mode of operation changes back to teach mode.

If, however the user does some manipulation of the robot arm, in step 363, the robot controller resets the free-drive mode period of time or if a different period of time is desired starts a restart free-drive mode period of time. Manipulation here includes registering a position such as a way point. Note that FIG. 3 illustrates an embodiment where a restart free-drive mode period of time is started, without excluding an embodiment where the free-drive mode period of time is simply reset. Again, in step 364, it is tested if the user manipulates the robot arm. If the user does not manipulate the robot arm, then after expiry of the restart free-drive mode period of time, the robot controller changes mode of operation.

The free-drive period of time and the restart free-drive period of time may be equal in length i.e. they may both be e.g. 3 seconds. Typically, these time periods are in the range of 0.5 second to 15 seconds, often in the range of 1 second to 5 seconds and often 2, 3 or 4 seconds. With this, as mentioned, these periods do not have to be equal in length.

After a change of mode of operation e.g. to stop or teach mode, then if the user desires to enter free-drive mode of operation again, he is to jump to step 342 again and establish the free-drive activation signal. It should be mentioned that it may require a reset or restart of the robot arm, if the robot arm has been in a stop mode of operation.

FIG. 4 illustrates one embodiment of a step 460 of running the robot arm in free-drive mode of operation and comprises a step 466 of obtaining a static motor torque $T_{static}$ keeping the robot arm in a static posture, a step 467 of obtaining an additional motor torque $T_{additional}$ e.g. applied from a user, a step 468 of combining the static motor torque and additional motor torque into a combined motor torque $T_{combined}$, and a step 469 of controlling the joint motor based on the combined motor torque.

The static motor torque $T_{static}$ obtained in step 466 can be obtained based on the actual posture of the robot arm $P_{robot}$ and the dynamic model of the robot arm $D_{robot}$, where the dynamic model of the robot arm defines a relationship between the posture of the robot arm and the motor torque needed to maintain the robot arm in a static posture under influence of gravity. The static motor torque indicates the motor torque that the joint motors need to provide in order to keep the robot arm in a static posture under influence of gravity. The actual posture of the robot arm $P_{robot}$ can be obtained based on joint output encoders indicating the angular position of each of the output flanges of the robot joints and the static motor torque $T_{static}$ can be provided as a vector or array where the static motor torque $T_{static,n}$ for each of the joint motors are provided, where n indicate the number of the robot joint with the robot motor that shall provide the obtained $n^{th}$ static motor torque. Driving the motor joint with currents generating the static motor torque results in the effect that the robot arm is kept in a static posture when it is only influenced by gravity. A user may move parts of the robot arm by manipulating the robot joints for instance by pushing, pulling and/or rotating parts of the robot arm whereby an external force/torque is applied to the robot arm. If such external force/torque exceeds the static motor torque of the robot joints, the joint motors will not be able to prevent modification of the robot arm posture and the user can thereby change to posture of the robot arm.

The additional motor torque $T_{additional}$ obtained in step 467 is obtained based on the force-torque $FT_{flange}$ provided to the tool flange and indicated by the force-torque sensor 114, the dynamic model of the robot arm $D_{robot}$ and the actual posture of the robot arm $P_{robot}$. The force-torque $FT_{flange}$ is provided by the force-torque sensor at the robot tool flange. The additional motor torque indicates the motor torque that the joint motors need to provide to move and/or rotate the robot tool flange in response to the force/torques provided to the robot tool flange and obtained by the force-torque sensor. For instance, a force provided in a given direction to the robot tool flange may result in a movement of the robot tool flange in that direction and the size of the force may indicate the desired acceleration of the movement. Similar, a torque provided in a given direction to the robot tool flange may result in a rotation of the robot tool flange in the direction of the torque and the size of the torque may indicate the desired angular acceleration of the rotation. The additional motor torque $T_{additional}$ can be provided as a vector where the additional motor torque $T_{additional,n}$ for each the joint motors is provided, where n indicate the joint number of the robot motor that shall provide the obtained static motor torque. Driving the motor joint with currents generating the additional motor torque results in the effect that the robot tool flange can be moved and/or rotated in the direction of the force and/or torque provided to the robot tool flange. In the illustrated embodiment the additional motor torque indicates the motor torques that in addition to the static torques needs to be provided in order to move the robot arm.

The combined motor torque $T_{combined}$ obtained in step 468 is obtained by combining the static motor torque $T_{static}$ and the additional motor torque $T_{addition}$ into a combined motor torque $T_{combined}$. In this embodiment this is achieved by adding the static motor torque and the additional motor torque:

$$T_{combined} = T_{static} + T_{additional} \qquad \text{eq. 4}$$

Consequently, the combined motor torque $T_{combined}$ indicate the total motor torques that need to be provide by the joint motors to both overcome gravity and move/rotate the robot tool flange based on the force-torques provided to the robot tool flange.

The step of controlling the joint motor based on the combined motor torque comprises providing a number of control signals to each of the joint motors indicating the motor torque of each joint motor $T_{motor,n}$, where n indicate the joint number of the robot motor that shall provide the motor torque. The motor torque of the joint motor may be regulated by varying the current through the joint motor as known in the art of motor regulation.

As described above in step 361, the free-drive period of time is started when the user stops manipulating the robot arm and in step 362, it is evaluated if the user manipulates the robot arm. If the user does not manipulate the robot art before expiry of this time period, the robot controller changes mode of operation indicated by thumb down. If on the other hand, the user manipulates the robot arm, the robot controller jumps to step 466 for changing posture of the robot in response to force applied by the user.

Further, as long as the robot arm is operated in the free-drive mode, the robot controller evaluates joint sensor parameters or derivables hereof. This evaluation is not illustrated in FIG. 3 or FIG. 4. This evaluation is similar to the evaluation described in relation to step 350 i.e. if the robot arm performs unexpected movements such as a movement not initiated by a force applied by a user. A movement not initiated by a user will typically be in the vertical plane in that gravity will pull in the payload if e.g. the force sensor drifts over time or payload weight change over time (if e.g. the payload is sensitive to temperature changes or part of the payload is used or removed). If e.g. the payload falls off a gripping tool, the robot controller will move the tool flange upward. This is advantageous in that should the payload fall off; this evaluation will ensure that the robot controller change mode of operation e.g. to a stop mode.

The speed of movement of the robot arm in the free-drive mode of operation is limited in vertical orientations to ensure that in case a payload is dropped, the robot arm speed does not accelerate. However, in horizontal orientations a dropped payload will not influence the speed of the robot arm, which is therefore less restrictive compared to speed in vertical orientations.

Deactivation of the free-drive mode of operation can be made either simply by letting the free-drive period of time expire, by pushing a button, exceeding a joint parameter threshold such as speed or acceleration, etc.

The joint sensor parameters are used as an indicator of movement of the robot arm. Accordingly, any sensor value or values derived based on input to the robot controller can be seen as a joint sensor parameter. Joint sensor parameters therefore include information of at least speed, acceleration, torque, motor torque, force and position. In an embodiment of the invention, movement of the tool flange and thereby the robot arm is checked based on the joint encoders. The joint encoders include both an input encoder indicating the angular position of the joint motor shaft and an output encoder indicating the angular position of the output flange (thus after the gear). As indicated, movement of the tool flange and thereby the robot arm can also be indicated or derived from input from one or more joints such as from an accelerometer 115, current sensor and the like.

The robot arm may be controlled in different modes of operation. When programmed, the robot arm may be operated in teach mode, when programming is completed, the robot arm may be operated in run mode and when violating safety functions, the robot arm may enter a stop mode. The user may activate free-drive mode from any of these modes of operation, however with this the current mode of operation of the robot arm before entering the free-drive mode of operation is typically the teach mode of operation.

In an embodiment, predefined areas of allowed operation in the free-drive mode of operation may be defined. Such areas may be used to protect the robot arm from collision with physical objects, define working space, etc. Operated in the free-drive mode of operation, the robot controller may communicate to the user that the robot arm is getting close to a border of such area. Such information may be communicated visually to the user via the user interface. Alternatively, it may be communicated to the user by increasing the motor current and thereby the motor torque provided by the joint motor so that the user will experience a resistance from the robot arm when continuing applying the manipulating force resulting in a movement of the robot arm towards the border.

An alternative way of communicating from the robot controller to the user is by so-called haptic feedback. Haptic feedback may be used by the robot controller e.g. to inform the user that the free-drive mode of operation is entered, that a border is getting close, etc. The haptic feed-back may be presented as different sequences or patterns for the user to be able to distinguish the meaning of the haptic feedback signals from each other. If the haptic feedback is used, it is preferred to not "vibrate" (change position) of joints between the same two positions for a longer period. The duration of the period should not cause lubricant between balls of a ball bearing to not lubricate the balls. Hence, if haptic feedback is required for a period of time longer than the this can be prevented, it would be preferred to move the robot arm a bit first in one direction and later back in the other direction so that at the end the robot arm is in its starting position to ensure lubrication of the balls.

The graphic user interface is in an embodiment implemented as a screen of the teach pendant. Via this interface, the user is able to communicate with the robot controller and the robot controller is able to communicate with the user. One piece of information which the robot controller may communicate to the user is time left of the different periods of time described above. Hence from an area of the screen, the robot controller may count down or up the activation period of time, the activation sequence period of time, the free-drive period of time, the restart free-drive period of time, etc. Because of this, the user is always from a look at the screen informed of time left of a period of time. The screen or display may be divided into segments intended for communication of different aspects of e.g. movement of the robot arm. A visualization of posture of the joints, location of robot tool e.g. relative to a virtual wall and how to move the robot tool back on the correct side of such wall just to mention some of the functions of the graphic user interface.

Further, the robot controller may via the interface device present to the user root cause to events leading to involuntary leaving the free-drive mode as well as guidance on how to (e.g. which joints to move how) get the robot arm back in a starting position, posture or desired location/orientation in space.

Further, an unintentional event occurs that would satisfy requirements to activate free-drive mode of operation and bring the robot controller in free-drive mode could occur. To avoid that such event does not repeatably makes the robot controller enter free-drive mode, a time period may be introduced that needs to expire before the robot controller can enter free-drive mode again.

From the above it is hereby clear that the change of mode of operation from a current mode of operation to the free-drive mode of operation is made in a safe manner ensuring that e.g. errors in payload weight information comprised by the robot controller does not result hazardous situations. This problem is solved by a user establishing a free-drive activation signal such as a force above a corresponding threshold value. In an embodiment continuously for an activation period of time. By this test, it is ensured, that the user's intension is to enter free-drive mode.

Subsequently, the robot controller switches mode of operation typically from normal mode of operation to free-drive mode. Initially upon entering the free-drive mode of operation, one or more joint sensor parameter values are monitored for an activation period of time and compared to corresponding threshold values. By this test, it is ensured, that the weight of the payload is correct. If not correct, one or more of the monitored joint sensor parameter values will exceed the corresponding threshold values. In case this happens, the robot controller will change mode of operation e.g. to a stop mode or non-free-drive mode of operation. If correct, the user is then able to move/manipulate the robot arm as desired in the free-drive mode of operation.

If the user does not apply a force to the robot arm in a given free-drive period of time/restart free-drive period of time, the robot controller interprets this as a wish from the user to switch back to teach mode (or another mode).

A further problem solved by the present invention is that it is possible to use both hands when changing posture (sometimes referred to as manipulating, moving or applying a force) of the robot arm. This is advantageous e.g. in the situation where a robot tool has to be positioned very precise e.g. a screwing tool above a screw or where the robot arm is physically to large and heavy to manipulate with only one hand.

A further problem solved by the present invention is that if the force and torque sensor has drifted and therefore is providing wrong information to the robot controller related to the weight of the payload, no unexpected hazardous movements of the robot arm will happen outside the defined threshold values.

In an embodiment of the invention a time period is started when a force above a force threshold is registered by the torque/force sensor (joint sensor), wherein the force is categorized as an intentional impact force if the registered force maintains above the force threshold for a determined force period of time and the torque registered by the torque/force sensor remains below a torque threshold for a determined torque period of time.

This is advantageous in that it has the effect, that unintentional impact forces can be sorted out. This is because intentional impact forces provided by e.g. a human is provided without an accompanying or limited torque. This is in contrary to a unintentional impact force e.g. from a collision or holding operation, where the force/torque sensor will register a twist and thereby a torque. Hence, no matter in which mode of operation the robot arm is operating, it is able to register an intentional impact force and based hereon e.g. change mode of operation, state of software program, be prepared to receive certain input, etc.

In an embodiment, the robot controller and the user communicate via applied force and robot feedback and based here on the robot controller enter the free-drive. First, the user applies an external force to the robot arm. The external force applied can be any type of force applied in any orientation in space. Hence, when the robot controller operates the robot arm e.g. in normal mode of operation and the user applies a force e.g. in a predetermined orientation in space such as perpendicular to the joint axis 105*f*. The direction or strength of the force provided by the user does not need to be know by the robot controller. Upon registering the external force, the robot controller will provide a robot feedback as a response. The robot feedback can be haptic feedback and when the user observes such haptic feedback, the user applies a predetermined force in a predetermined pattern or strength to the robot arm. This predetermined force is known by the robot controller and if a match exists between the applied predetermined force detected by the robot controller and the expected predetermined force the robot controller determines that a user intentionally wishes to enter free-drive mode and is therefore changing mode of operation to free-drive mode.

The predetermined force applied by the user may be a simple force in a certain direction for a certain period of time. It just has to be known by the robot controller and thereby be predetermined. Predetermined force in this embodiment should be understood as a pattern, sequence of moves of robot joints, etc.

The robot feedback may be provided immediately after the external force is registered but could also be provided within 0.5 second to 5 seconds such as e.g. 1, 1,5, 2 or 2.5 seconds from when the external force is registered. Similarly, the predetermined force may be provided immediately after the robot feedback is provided but could also be provided within 0.5 second to 5 seconds such as e.g. 1, 1,5, 2 or 2.5 seconds from when the robot feedback is provided. These time periods are determined based on what is convenient for the user and to ensure that an unintentional external force similar to the predetermined force, applied e.g. 1 minute after the robot feedback is stopped would not initiate a change to free-drive mode of operation. In this embodiment of the invention, where robot and user "communicate", the activation sequence period of time is preferably set to zero or close to zero seconds i.e. below 1 second. This has the effect that uncontrolled movement of the robot arm during the activation sequence period of time e.g. due to wrong registration of payload weight in the robot controller is reduce or completely eliminated.

Finally, it should be noted that the applied force, could be a force applied to one or more different input devices on the interface device. Such input devices could be buttons, microphones, touch screen, accelerometers/gyros, etc.

BRIEF DESCRIPTION OF FIGURE REFERENCES

101: robot arm;
102*a*-102*f*: robot joint
103: robot base
104: robot tool flange
105*a*-105*f*: robot joints axis
106*a*-106*f*: rotation arrow of robot joints
107: robot tool flange reference point
108: base reference point
109: Direction of gravity
110: Robot controller
111: interface device
112: display
113: input device
114: force-torque sensor
115: acceleration sensor
216*a*, 216*b*, 216*f*: output flange
217*a*, 217*b*, 2179*f*: joint motors
218*a*, 218*b*, 218*f*: output axle
219*a*, 219*b*, 219*f*: joint sensor
220*a*, 220*b*, 220*f*: joint sensor signal
221: processor
222: memory
223*a*, 223*b*, 223*f*: motor control signals
224: force-torque signal
225: acceleration signal
330: initializing
340: evaluating user inputs
341: normal mode
342: free-drive mode signal
345: activate free drive?
350: activating free-drive
351: start activation sequence period of time
352: establish joint sensor parameters
355: joint sensor parameters are compared to allowable changes
360, 460: free drive mode of operation
361: start free drive period of time
362: user manipulates the robot arm
363: start a restart free-drive mode period of time
364: user manipulation within time?
466: obtaining a static motor torque
467: obtaining an additional motor torque
468: combining the static motor torque and additional motor torque
469: control joint motors based on combined torque

The invention claimed is:

1. A robot controller for controlling a robotic arm, the robot controller for switching the robotic arm from a first mode of operation to a free-drive mode of operation in response to a free-drive mode signal, where, in the free-drive mode of operation, the robot controller is configured to perform operations comprising:
  keeping the robotic arm in a posture that is static when only gravity acts on the robotic arm;
  allowing a change in the posture of the robotic arm when an external force different from gravity is applied to the robotic arm;
  monitoring a value of at least one parameter based on a signal of at least one sensor associated with a joint of the robotic arm;
  comparing the value of the at least one parameter to at least one threshold value;
  keeping the robotic arm in the free-drive mode of operation when the value of the at least one parameter does not exceed the at least one threshold value during a free-drive safety period;
  wherein the at least one threshold value is based on a virtual three-dimensional geometric shape surrounding a part of the robotic arm;
  wherein the free-drive safety period comprises a time period within which at least part of the robotic arm is allowed to move within the virtual three-dimensional geometric shape without creating a hazard; and redefining the virtual three-dimensional geometric shape following expiration of the free-drive safety period and when the value of the at least one parameter has not exceeded the virtual three-dimensional geometric shape during the free-drive safety period.

2. The robot controller of claim 1, wherein, in the free-drive mode of operation, the robot controller is configured to fix a position of the virtual three-dimensional geometric shape in relation to a reference point that is in surroundings of the robotic arm and that is fixed in relation to a stationary part of the robotic arm.

3. The robot controller of claim 2, wherein the robot controller is configured to define the position of the virtual three-dimensional geometric shape based on a position of the part of the robotic arm in relation to the reference point.

4. The robot controller of claim 3, wherein, during the free-drive mode of operation, the robot controller is configured to redefine the position of the virtual three-dimensional geometric shape in relation to the reference point.

5. The robot controller of claim 1, wherein the robot controller is configured to define a position of the virtual three-dimensional geometric shape in relation to a reference point based on a plurality of positions of the part of the robotic arm in relation to a fixed point corresponding to an object in surroundings of the robotic arm, where the plurality of positions of the part of the robotic arm have been obtained at different points in time.

6. The robot controller of claim 1, wherein the robot controller is configured to provide feedback to a user upon determining if the value of the at least one parameter is within a feedback value relating to the virtual three-dimensional geometric shape.

7. The robot controller of claim 6, wherein the feedback comprises force provided by a part of the robotic arm, where the force is in a direction away from the virtual three-dimensional geometric shape.

8. The robot controller of claim 7, wherein a size of the force increases as the value of the at least one parameter approaches the virtual-dimensional geometric shape.

9. A robotic arm comprising joints connecting a base and a tool flange, each of the robot joints comprising:
  an output flange rotatable in relation to a robot joint body;
  a motor configured to rotate the output flange; and
  at least one sensor for providing a sensor signal indicative of at least one of an angular position of the output flange, an angular position of a shaft of the motor, or a current of the motor;
  wherein the robotic arm comprises at least one robot controller of claim 1 configured to control the joints by controlling motor torque provided by one or more motors based on one or more sensor signals.

10. A method of operating a robotic arm in a free-drive mode of operation, where the robotic arm has been switched into the free-drive mode of operation by a robot controller in response to receiving a free-drive mode signal set by a user, where the free-drive mode of operation comprises:
  keeping the robotic arm in a posture that is static when only gravity acts on the robotic arm;
  changing the posture of the robotic arm when an external force different from gravity is applied to the robotic arm;
  monitoring a value of at least one parameter associated with a sensor of a joint on the robotic arm;
  comparing the value of the at least one parameter to at least one threshold value, where the at least one threshold value is based on a virtual three-dimensional geometric shape surrounding a part of the robotic arm;
  keeping the robotic arm in the free-drive mode of operation when the value of the at least one parameter does not exceed the virtual three-dimensional geometric shape within at a free-drive safety period, where the free-drive safety period comprises a time period within which at least part of the robotic arm is allowed to move within the virtual three-dimensional geometric shape without creating a hazard; and
  redefining the virtual three-dimensional geometric shape following expiration of the free-drive safety period and when the value of the at least one parameter has not exceeded the virtual three-dimensional geometric shape during the free-drive safety period.

11. The method of claim 10, further comprising:
fixing a position of the virtual three-dimensional geometric shape in relation to a reference point following receipt of the free-drive mode signal, the reference point being in surroundings of the robotic arm and fixed in relation to a stationary part of the robotic arm.

12. The method of claim 11, further comprising:
during the free-drive mode of operation, redefining the position of the virtual three-dimensional geometric shape in relation to the reference point.

13. The method of claim 10, further comprising:
providing feedback to the user when the value of the at least one parameter is within a feedback value relating to the virtual three-dimensional geometric shape.

14. The method of claim 13, wherein providing feedback to the user comprises providing a force using at least a part of the robotic arm, where the force is in a direction away from the virtual-dimensional geometric shape.

15. The method of claim 14, wherein providing the force comprises increasing the force as the value of the at least one parameter approaches the virtual-dimensional geometric shape.

16. A system comprising a robotic arm, the system comprising:
  a base;
  a tool flange;
  joints connecting the base and the tool flange, each of the joints comprising:
    an output flange rotatable in relation to a body of a joint;
    a motor configured to rotate the output flange; and
    at least one sensor for providing a sensor signal indicative of at least one of an angular position of the output flange, an angular position of a shaft of the motor, or a current of the motor; and
  at least one robot controller configured to control one or more of the joints by controlling motor torque of one or more motors based on one or more sensor signals, the at least one robot controller being configured to perform operations comprising:
    monitoring a value of at least one parameter that is based on the sensor signal of the at least one sensor for the one or more of the joints;
    comparing the value of the at least one parameter to at least one threshold value;
    keeping the robotic arm in a free-drive mode of operation when the value of the at least one parameter does not exceed the at least one threshold value during a free-drive safety period;
    wherein the at least one threshold value is based on a virtual three-dimensional geometric shape surrounding a part of the robotic arm;

redefining the virtual three-dimensional geometric shape following expiration of the free-drive safety period and when the value of the at least one parameter has not exceeded the virtual three-dimensional geometric shape during the free-drive safety period;

wherein the free-drive safety period comprises a time period within which at least part of the robotic arm is allowed to move within the virtual three-dimensional geometric shape without creating a hazard; and wherein in the free-drive mode of operation, a posture of the robotic arm is changeable through application of force to the robotic arm and where, in the absence of the force, the at least one robot controller is configured to maintain a posture of the robotic arm.

17. The system of claim 16, wherein, in the free-drive mode of operation, the at least one robot controller is configured to fix a position of the virtual three-dimensional geometric shape in relation to a reference point that is in surroundings of the robotic arm and a distance from at least the part of the robotic arm.

18. The system of claim 17, wherein the at least one robot controller is configured to define the position of the virtual three-dimensional geometric shape based on a position of the part of the robotic arm in relation to the reference point.

19. The system of claim 18, wherein, during the free-drive mode of operation, the at least one robot controller is configured to redefine the position of the virtual three-dimensional geometric shape in relation to the reference point.

20. The system of claim 16, wherein the at least one robot controller is configured to define a position of the virtual three-dimensional geometric shape in relation to a reference point based on a plurality of positions of the robotic arm in relation to a fixed point corresponding to an object in surroundings of the robotic arm, where the plurality of positions of the robotic arm have been obtained at different points in time, the reference point being in surroundings of the robotic arm and a distance from at least part of the robotic arm.

* * * * *